(12) United States Patent
Bush et al.

(10) Patent No.: US 12,644,760 B2
(45) Date of Patent: Jun. 2, 2026

(54) SENSOR DEPLOYMENT FOR DISTRIBUTED ACOUSTIC SENSING INTERROGATION IN SUBSEA APPLICATIONS

(71) Applicant: Halliburton Energy Services, Inc., Houston, TX (US)

(72) Inventors: Ira Bush, Van Nuys, CA (US); Mikko K. Jaaskelainen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 325 days.

(21) Appl. No.: 18/532,952

(22) Filed: Dec. 7, 2023

(65) Prior Publication Data

US 2025/0189363 A1 Jun. 12, 2025

(51) Int. Cl.
*G01H 9/00* (2006.01)
*G01D 5/353* (2006.01)
*G01V 1/22* (2006.01)

(52) U.S. Cl.
CPC ......... *G01H 9/004* (2013.01); *G01D 5/35364* (2013.01); *G01V 1/226* (2013.01); *G01V 2210/1429* (2013.01)

(58) Field of Classification Search
CPC .............. G01H 9/004; G01D 5/35364; G01D 5/35316; G01D 5/35329; G01D 5/35374; G01D 5/268; G01V 1/226; G01V 2210/1429; G01V 1/364; G01V 1/42; G01V 1/48; G01V 1/001; G01V 1/288; G01V 1/44; G01V 1/16; G01K 11/322; G01K 11/32; E21B 47/001; E21B 47/00;

E21B 49/00; E21B 17/20; E21B 33/076; E21B 47/107; E21B 47/101; E21B 47/07; E21B 44/00; E21B 47/123; E21B 47/14; E21B 47/06; H04B 10/071; G01L 9/0076
See application file for complete search history.

(56) References Cited

U.S. PATENT DOCUMENTS

| | | | |
|---|---|---|---|
| 7,743,661 B2 | 6/2010 | Berthold et al. | |
| 10,309,825 B2 | 6/2019 | Suh et al. | |
| 10,337,316 B2 | 7/2019 | Jaaskelainen et al. | |

(Continued)

OTHER PUBLICATIONS

International Search Report and Written Opinion for International Patent Application No. PCT/US2023/086271 dated Aug. 29, 2024. PDF file. 9 pages.

*Primary Examiner* — Brandi N Hopkins
(74) *Attorney, Agent, or Firm* — John Wustenberg; C. Tumey Law Group PLLC

(57) ABSTRACT

A distributed acoustic system (DAS) may include at least one laser that that transmits at least one continuous wave (CW) light, a pulser disposed after and optically connected to the at least one laser to form a light pulse, and a splitter optically connected to the pulser to optically split the light pulse into a plurality of light pulses. The DAS may further include a proximal circulator optically connected to a first output of the splitter, a distal circulator optically connected to the proximal circulator, and a sensor fiber attached to the distal circulator. A method for using the DAS may include setting a pulse power for a laser, transmitting one or more light pulses from the laser into a distributed acoustic system (DAS), and measuring a signal to noise ratio (SNR) from a backscatter light created within the fiber optical cable and the sensor fiber.

20 Claims, 14 Drawing Sheets

(56)     References Cited

U.S. PATENT DOCUMENTS

| | | | |
|---|---|---|---|
| 10,961,844 B2 | 3/2021 | Jaaskelainen et al. | |
| 11,047,230 B2 | 6/2021 | Ellmauthaler et al. | |
| 11,111,780 B2 | 9/2021 | Barfoot et al. | |
| 11,326,936 B2 | 5/2022 | Ellmauthaler et al. | |
| 11,396,808 B2 | 7/2022 | Jaaskelainen et al. | |
| 11,493,380 B2 | 11/2022 | Stark et al. | |
| 11,549,369 B1 | 1/2023 | LeBlanc et al. | |
| 11,578,547 B2 | 2/2023 | Jaaskelainen et al. | |
| 11,634,973 B2 | 4/2023 | Park et al. | |
| 11,719,080 B2 | 8/2023 | Bland et al. | |
| 11,732,578 B2 | 8/2023 | Ellmauthaler et al. | |
| 11,746,627 B1 | 9/2023 | Jaaskelainen | |
| 12,130,394 B2 * | 10/2024 | Stopford | E21B 47/135 |
| 2008/0030739 A1 | 2/2008 | Hartog et al. | |
| 2018/0058982 A1 | 3/2018 | Hartog et al. | |
| 2020/0362692 A1 | 11/2020 | Ellmauthaler et al. | |
| 2021/0096020 A1 | 4/2021 | Stark et al. | |
| 2021/0270131 A1 | 9/2021 | Ellmauthaler et al. | |
| 2021/0364669 A1 | 11/2021 | Dusterhoft et al. | |
| 2022/0186612 A1 | 6/2022 | Maida, Jr. et al. | |
| 2022/0259971 A1 | 8/2022 | Ellmauthaler et al. | |
| 2022/0403734 A1 | 12/2022 | Jaaskelainen et al. | |
| 2022/0412821 A1 | 12/2022 | Jaaskelainen et al. | |
| 2023/0221151 A1 | 7/2023 | Farhadiroushan et al. | |
| 2023/0243989 A1 | 8/2023 | Suh et al. | |
| 2023/0332499 A1 | 10/2023 | Ellmauthaler et al. | |
| 2023/0344544 A1 | 10/2023 | Wilson et al. | |

* cited by examiner

SENSOR DEPLOYMENT FOR DISTRIBUTED ACOUSTIC SENSING INTERROGATION IN SUBSEA APPLICATIONS

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing may obtain real-time, high-resolution, highly accurate temperature and strain (acoustic) data along the entire wellbore. In examples, discrete sensors, e.g., for sensing pressure and temperature, may be deployed in conjunction with the optical fiber. Additionally, distributed fiber optic sensing may eliminate downhole electronic complexity by shifting all electro-optical complexity to the surface within the interrogator unit. Optical fibers may be permanently deployed in a wellbore via single- or dual-trip completion strings, behind casing, on tubing, or in pumped down installations; or temporally via coiled tubing, slickline, or disposable cables.

The field of Distributed Acoustic Sensing (DAS) has rapidly evolved from "high science" fascinations to multi-market distributed sensing panacea. Initial roots formed as military defense focused applications, simmering for perhaps two decades as restricted "classified" projects.

Once those restrictions were relaxed (circa 2000), the interests and scope broadened to commercial interest/endeavors including intrusion detection, downhole oil and gas sensing, pipeline monitoring, third party intrusion detection, power distribution monitoring, geophysical seismic detection and others. Moving forward to current day, many new applications have surfaced to address the numerous agendas for Smart Cities, land subsidence, Homeland Security, infrastructure, where the DAS technology has become more sophisticated and addresses sensing applications well beyond tripwire capability, where now the sensor fidelity and linearity performance is more likened to a giant string of microphones or seismometers.

A typical DAS system comprises an interrogator which couples to a fiber to comprise the sensor. Current commercial pricing for interrogators ranges from $50,000 (the simple low fidelity type) up to $250,000 (high performance type). These costs well outrange the markets they may address. This is principally due to current design architecture used for DAS Interrogators. It is not well suited for scale-up cost reductions.

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method for component sharing by implementing a single enhanced launched system to feed a large plurality of receive systems. All distributed acoustic sensing (DAS) interrogators utilized two opto-electronic systems. First, a launch system which appropriately prepares the light to propagate forward into the sensor fiber. Second, a receiver system which receives the backscattered light from the sensor fiber which appropriately processes that light and photoconverts it to an electronic signal. Optimal sharing may be realized when as many of the components as possible are placed in the launch system and output optical launch power is increased which fans out to a large plurality of sensors. Discussed below are systems and methods for new architecture designs for DAS interrogators that substantially reduce the components utilized and the cost per sensor channel in downhole operations.

Figure 1:
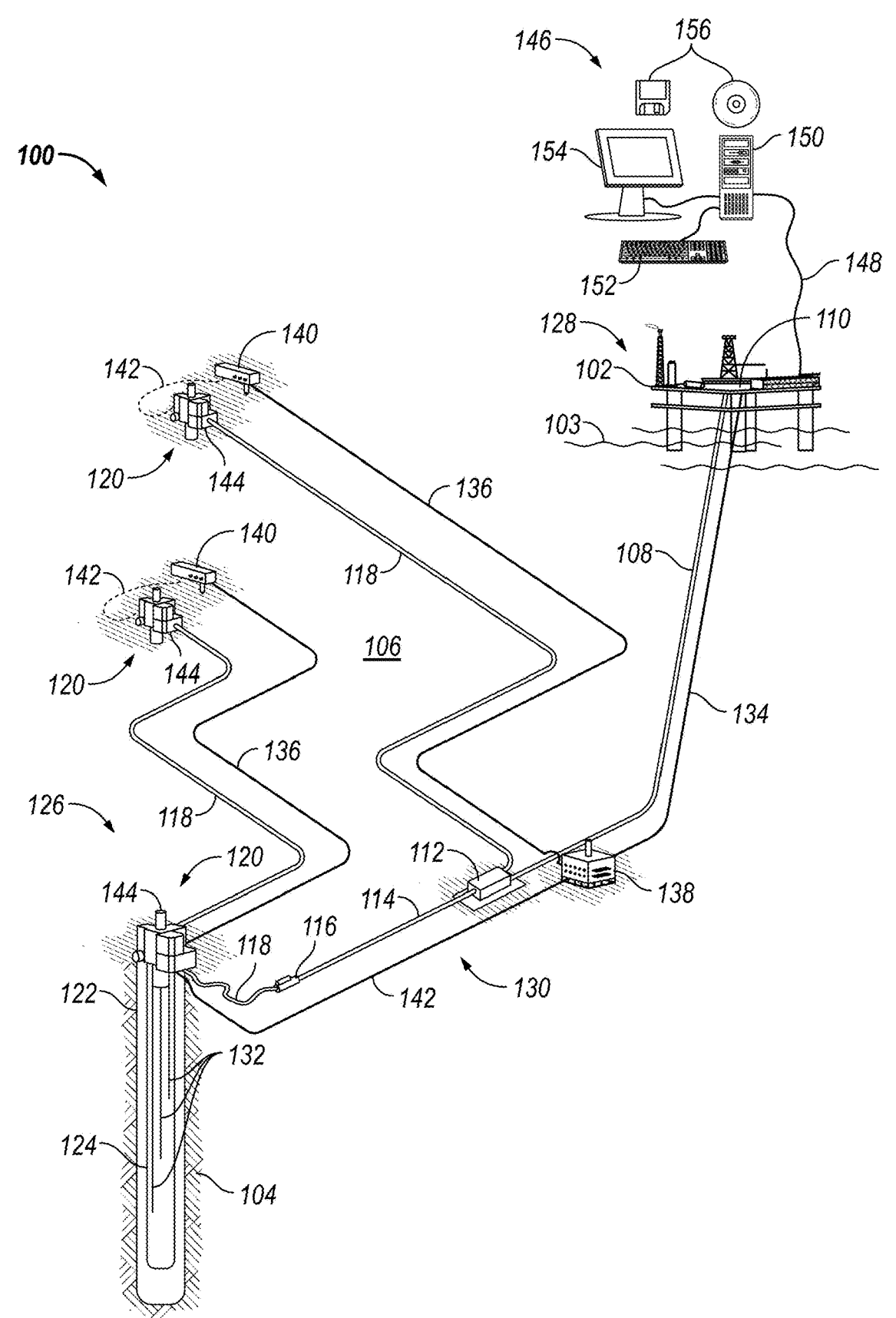
FIGS. 1 and 2 illustrate an example of a drilling operation in a subsea environment.
Figure 2:
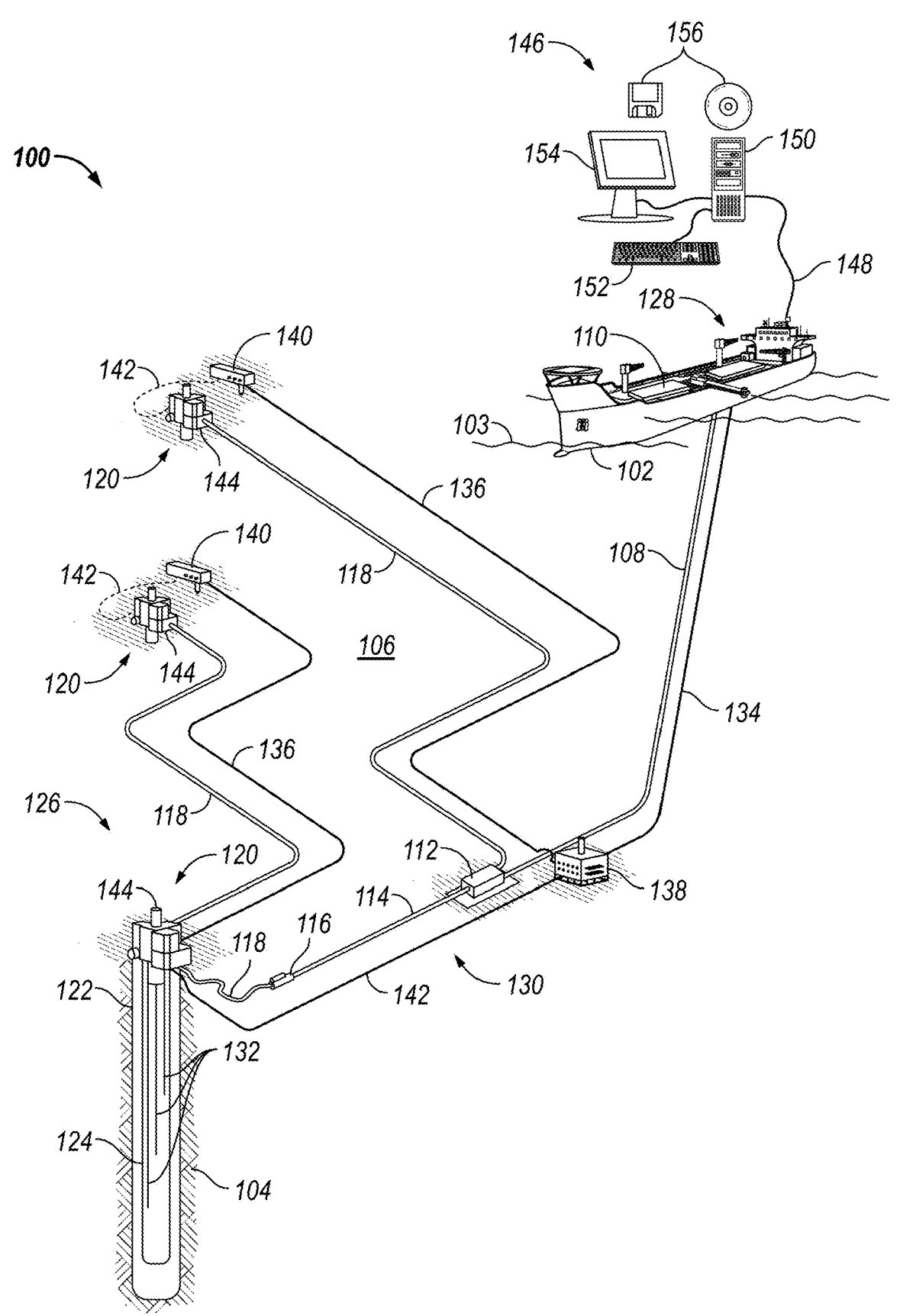

FIGS. 1 and 2 illustrate examples of a well system 100 that may employ the principles of the present disclosure. More particularly, well system 100 may include a floating vessel 102 centered over a subterranean hydrocarbon bearing formation 104 located below a sea floor 106. As illustrated, floating vessel 102 is depicted as an offshore, semi-submersible oil and gas drilling platform, but could alternatively include any other type of floating vessel such as, but not limited to, a drill ship, a pipe-laying ship, a tension-leg platforms (TLPs), a spar platform, a production platform, a floating production, storage, and offloading (FPSO) vessel, a floating production unit (FPU), and/or the like. Additionally, and without loss of generality, the methods and systems described below may also be utilized for subsea tie-backs to a fixed offshore platform, an onshore facility, or a facility on an artificial island. Moreover, the systems and methods of the present disclosure are applicable to onshore reservoirs and related their facilities. A subsea conduit or riser 108 (which is also referred to as a flowline below) extends from a deck 110 of floating vessel 102 to sea floor 106 and may connect to a production manifold 112. As illustrated, static pipe 114 may run from production manifold 112 to a pipeline end termination 116. Flexible pipe 118 may attach a subsea tree 120 to pipeline end termination 116. In examples, flexible pipe 118 may travers from production manifold 112 and connect directly to subsea tree 120. Additionally, flexible pipe 118 may connect one subsea tree 120 to another subsea tree 120, effectively tying one or more subsea trees 120 together and allow for a single flexible pipe 118 to connect one or more subsea trees 120 to a single production manifold 112.

Subsea tree 120 may cap a wellbore 122 that has been drilled into formation 104. Within wellbore may be a completion system consisting of one or more tubulars 124 that are connected to subsea tree 120. During operations, formation fluids may be produced from formation 104, and flow through one or more tubulars 124 to subsea tree 120. As subsea tree 120 is attached to floating vessel 102, formation fluid may flow from subsea tree 120, through flexible pipe 118, pipeline end termination 116, static pipe 114, production manifold 112, and up through riser 108 to floating vessel 102 for processing, storage, and subsequent offloading or export.

To monitor downhole operations, a Distributed Acoustic Sensing (DAS) system 126 may be employed from floating vessel 102. DAS 126 system utilizes distributed and/or discrete fiber optic sensing as a cost-effective method of obtaining real-time, high-resolution, highly accurate physical measurements, such as but not limited to temperature, strain, and acoustic measurements along the entire wellbore, while simultaneously eliminating downhole electronic complexity by shifting all electro-optical complexity to the interrogator unit (IU), also called an interrogator, located onboard floating vessel 102. The interrogator may be disposed with launch optoelectronics 128 disposed on floating vessel 102. It should be noted that DAS system 126 connects optical devices, described below, by single mode fibers, multimode fibers, and/or enhanced fibers. DAS 126 may include a launch optoelectronics 128, umbilical line 130, and at least one sensing fiber 132. As illustrated, launch optoelectronics 128 may be at least partially disposed on floating vessel 102. Launch optoelectronics 128 may connect to umbilical line 130. Umbilical line 130 (which may also be part of flowline discussed below) may include one or more optical fibers that traverse from a local electronics room (LER) or central control room (CCR) to a topside umbilical termination assembly (TUTA) onboard floating vessel 102. Umbilical line 130 may include a dynamic umbilical line 134, a subsea umbilical termination assembly (SUTA) 140, and a static umbilical line 136. Umbilical line may further include optical flying lead 142 and optical feedthrough system 144. Umbilical line 130 (which may also be referred to as a flowline, discussed below) may include one or more fiber optic cables. Each fiber optic cable may include one or more optical fibers.

With continued reference to FIGS. 1 and 2, launch optoelectronics 128 may be connected to an information handling system 146 through connection 148, which may be wired and/or wireless. It should be noted that both information handling system 146 and launch optoelectronics 128 are disposed on floating vessel 102. Both systems and methods of the present disclosure may be implemented, at least in part, with information handling system 146. Information handling system 146 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 146 may be a processing unit 150, a network storage device, or any other suitable device and may vary in size, shape, performance, functionality, and price. Information handling system 146 may include random access memory (RAM), one or more processing resources such as a central processing unit (CPU) or hardware or software control logic, ROM, and/or other types of nonvolatile memory. Additional components of the information handling system 146 may include one or more disk drives, one or more network ports for communication with external devices as well as an input device 152 (e.g., keyboard, mouse, etc.) and video display 154. Information handling system 146 may also include one or more buses operable to transmit communications between the various hardware components.

Alternatively, systems and methods of the present disclosure may be implemented, at least in part, with non-transitory computer-readable media 156. Non-transitory computer-readable media 156 may include any instrumentality or aggregation of instrumentalities that may retain data and/or instructions for a period of time. Non-transitory computer-readable media 156 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations in a subsea environment may present optical challenges for a DAS based DAS 126. For example, in a DAS system, a maximum 539 that may be used is approximately inversely proportional to fiber length due to optical non-linearities in the fiber. Therefore, the quality of the overall signal is poorer with a longer fiber than a shorter fiber. This may impact any DAS like system, since the distal end of the sensing fiber 132 may include an interval of interest (i.e., the reservoir) in which sensing fiber 132 may be deployed. The interval of interest may include wellbore 122 and formation 104. For pulsed DAS systems, an additional challenge is the drop-in signal to noise ratio (SNR) and spectral bandwidth associated with the decrease in the number of light pulses that may be launched into the fiber per second (i.e., DAS pulse repetition rate) when interrogating fibers with overall lengths exceeding 10 km. As such, utilizing DAS 126 in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second.

Many reservoirs may have existing wells in the same or neighboring reservoir layers where pressure may be locally reduced due to production, and all reservoirs are inhomogeneous to various degrees. Future wells may be placed in areas where reservoir characteristics are more complex as many sweet spots with good reservoir conditions may already be drilled.

It is therefore desirable to monitor fracturing operations using low frequency strain monitoring in order to verify that the generated fractures are being placed per the plan given the various uncertainties. One practical and cost-effective technology for fracture monitoring is based on Distributed Acoustic Sensing (DAS) with the optical sensing fiber in monitoring wells.

Barriers to large scale implementation include cost, complexity, and lack of automation. The methods and systems described below with massive DAS designs reduce cost and complexity, in particular when you apply it to a modular approach. In a modular approach the DAS system may have a stand-alone system with automation, small enclosure that may be loaded on a truck bed, small low noise AC, vibration isolation and satellite connection for data communication. The current approach may further reduce the thermal footprint as less components for each optical sensing fiber, and also increase reliability as the system component count goes down per channel when compared with conventional approaches. The thermal, mechanical, and acoustic noise contribution of a system is an improvement over conventional approaches. It will be more thermally stable as the system is fully enclosed whereas current practice is to keep the system in a trailer where personnel open doors and move in/out of the trailer. The system will also have less mechanical vibration as there are no personnel walking around and you have no slamming doors. Likewise, the system will be more acoustically isolated from conversations, slamming doors and isolation barriers.

The methods and systems described below may be used for various measurements in the zone of interest where measurement applications may include one or more of low frequency strain measurements, microseismic measurement, production flow measurements, leak detection measurements, Vertical Seismic Profiling (VSP) measurements, seismic survey measurements etc., and many of these measurements have different signal attributes in terms or signal frequencies and amplitudes. Characteristic may differ between different measurement application e.g. a low frequency strain measurement algorithm may be optimized for data below e.g. 10 Hz or in some instances below 1 Hz or even below 0.1 Hz, microseismic data would normally reside in the 10 Hz to 500 Hz and more particularly between 30 Hz to 100 Hz, whereas a VSP survey may be optimized between 6 Hz to 150 Hz or more likely coordinated with the vibrational source frequency content of e.g. 10-100 Hz in many instances. One interrogator within launch optoelectronics 128 may be used to simultaneously measure broadband data for multiple applications simultaneously and the signal processing path may different for the different applications and likewise the noise cancellation algorithm used may be tailored to each different application. The time constant for a low frequency strain application targeting data below 1 Hz would be significantly different from a microseismic survey targeting data up to 500 Hz. Thus, DAS systems and methods may be utilized for production monitoring, specifically as subsurface flow meters using fiber wrapped around surface flow pipes and then used for surface flow metering. Other measurements may comprise subsurface ICV/AICD injection/production monitoring. where flow models may be built for downhole monitoring where fluids pass through orifices of known size. Additionally, surface flow lines and pipelines may be monitored for flow assurance, flow regime, slugs (gas, sand) and thereby prepare processing facilities.

Figure 3:
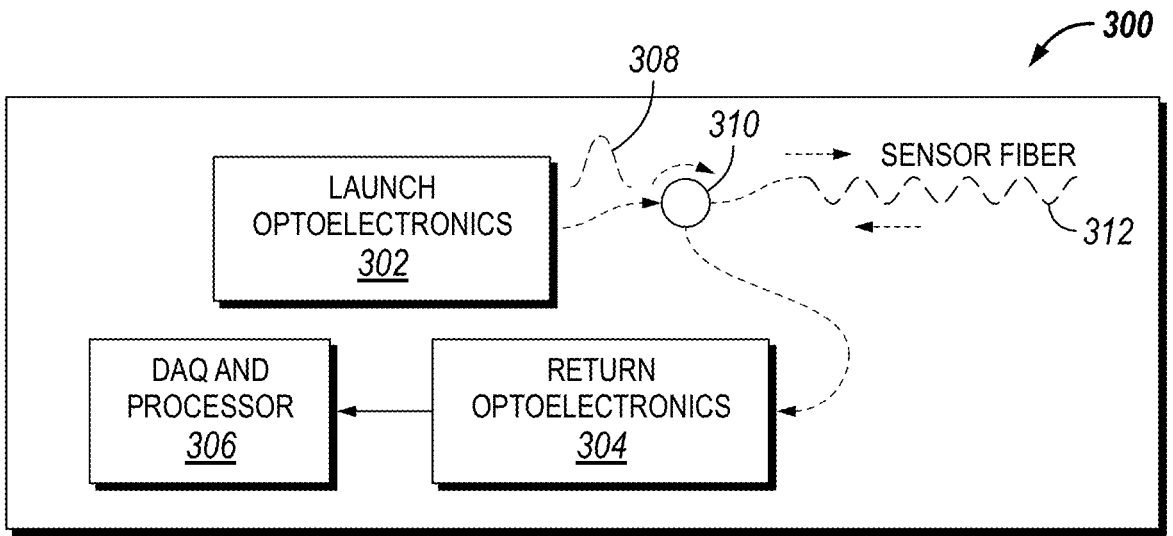
FIG. 3 illustrates an example of a distributed acoustic system (DAS)

FIG. 3 illustrates a schematic example of architecture for DAS 300 (also identified as DAS 126) that may be utilized for macro systems. As illustrated, DAS 300 may comprise launch optoelectronics 302 (also identified as launch optoelectronics 128), return optoelectronics 304, and acquisition and processor 306. During operations, one or more light pulses 308 may be transmitted from launch optoelectronics 302. Launch optoelectronics 302 may comprise "interrogation" elements that "launch" the light into sensor fiber 312 (also identified as sensing fiber 132). Generally, launch optoelectronics 302 may comprise one or more lasers. In examples, if a design of DAS 300 utilizes multiple wavelengths, then one or more Wavelength Division Multiplexers (WDMs) may be used to combine all the wavelengths onto one optical fiber. For this disclosure, optical fibers may comprise single mode telecommunication fibers fabricated to ITU standards G.652 and G.657. Also, other custom single mode fibers are used which extend operational temperature ranges or enhance/increase distributed backscatter coefficients. Further, a variety of multimode fibers are used, where typically these are pre-installed and initially used for other applications. For example, "enhanced backscatter fibers" may be utilized in DAS 300. Where sensor fibers 312 may be traditional Single mode fiber with backscatter characteristics compatible with ITU fiber standard G.652, enhanced backscatter fibers may increase backscatter signal strength as high as 100-fold. Such enhancements are accomplished by fiber inscription, or higher fiber core doping concentrations. If DAS 300 utilizes a pulsed system, pulse forming elements may be utilized to create high (on-off) extinction optical pulsing. This may be performed by semi-conductor optical amplifiers (SOA) which are driven with electronic current pulses or Acoustic Optical Modulators (AOM) or fast optical switches which are driven with electrical voltage pulses. Additionally, launch optoelectronics 302 may comprise optical phase or frequency modulators which may be driven with electrical modulation signals which in turn are converted to optical modulation signals. These devices may be in-line or incorporated with splitters and recombiners to effectuate optical modulation functions which incorporate the desired interrogation strategy. Many designs also incorporate optical amplifiers which are usually Erbium. Further, directly prior to launch there may be optical splitters, and circulators which multiplex the outbound in backscatter light to their respective optical propagation paths.

In examples, launch optoelectronics 302 may operate and function to transmit one or more light pulses 308 into DAS 300. Within launch optoelectronics 302, one or more light pulses 308 may be modulated and/or pulsed by any combination of modulator and/or pulser. The modulators and/or pulsers may be arranged in-line or split into a parallel path, where optionally one of the legs in the parallel path has a fiber optic delay line, and the two paths are combined with a coupler to a single path, where third there is usually an optical amplifier, and fourth is a multiplex device. For single sensor systems, this is usually a circulator and/or a multi-element splitter where each split output is sent to a circulator. As illustrated, one or more light pulses 308 emitted from launch optoelectronics 302 may traverse to a circulator 310 by an optical fiber.

A circulator 310 functions to steer light unidirectionally between one or more input and outputs of circulator 310. Without limitation, circulators 310 are three-port devices wherein light from a first port is split internally into two independent polarization states and wherein these two polarization states are made to propagate two different paths inside circulator 310. These two independent paths allow one or both independent light beams to be rotated in polarization state via the Faraday effect in optical media. Polarization rotation of the light propagating through free space optical elements within the circulator thus allows the total optical power of the two independent beams to uniquely emerge together with the same phase relationship from a second port of circulator 310.

Conversely, if any light enters the second port of circulator 310 in the reverse direction, the internal free space optical elements within circulator 310 may operate identically on the reverse direction light to split it into two polarizations states. After appropriate rotation of polarization states, these reverse in direction polarized light beams, are recombined, as in the forward propagation case, and emerge uniquely from a third port of circulator 310 with the same phase relationship and optical power as they had before entering circulator 310. Additionally, as discussed below, circulator 310 may act as a gateway, which may only allow chosen wavelengths of light to pass through circulator 310 and pass to sensor fiber 312.

Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

Figures 4A, 4B, 4C, 4D:
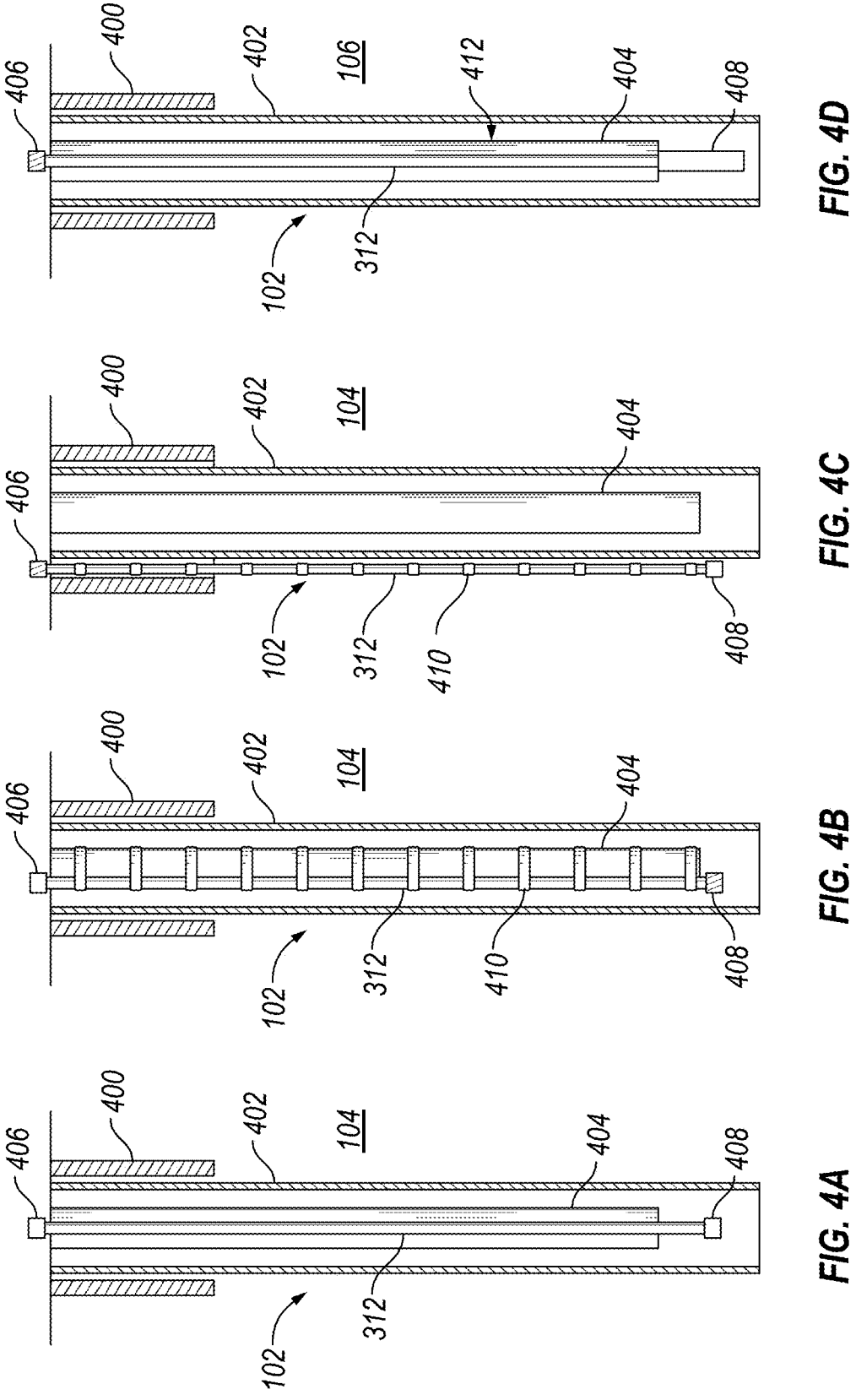
FIGS. 4A-4D illustrate examples of a downhole fiber deployed in a wellbore.

FIGS. 4A-4D illustrate examples of different types of deployment of sensor fiber 312 in wellbore 122 (e.g., referring to FIGS. 1 and 2). As illustrated in FIG. 4, wellbore 122 deployed in formation may include surface casing 400 in which production casing 402 may be deployed. Additionally, production tubing 404 may be deployed within production casing 402. In this example, sensor fiber 312 may be temporarily deployed in a wireline system in which a bottom hole gauge 408 is connected to the distal end of sensor fiber 312, Further illustrated, sensor fiber 312 may be coupled to a fiber connection 406. Without limitation, fiber connection 406 may attach sensor fiber 312 to circulator 310 (e.g., referring to FIG. 3). Fiber connection 406 may operate with an optical feedthrough system (itself comprising a series of wet- and dry-mate optical connectors) in the wellhead that optically couples sensor fiber 312 to circulator 310, FIG. 4B illustrates an example of permanent deployment of sensor fiber 312. As illustrated in wellbore 122 deployed in formation may include surface casing 400 in which production casing 402 may be deployed. Additionally, production tubing 404 may be deployed within production casing 402. In examples, sensor fiber 312 is attached to the outside of production tubing 404 by one or more cross-coupling protectors 410. Without limitation, cross-coupling protectors 410 may be evenly spaced and may be disposed on every other joint of production tubing 404. Further illustrated, sensor fiber 312 may be coupled to fiber connection 406 at one end and bottom hole gauge 408 at the opposite end.

FIG. 4C illustrates an example of permanent deployment of sensor fiber 312. As illustrated in wellbore 122 deployed in formation may include surface casing 400 in which production casing 402 may be deployed. Additionally, production tubing 404 may be deployed within production casing 402, In examples, sensor fiber 312 is attached to the outside of production casing 402 by one or more cross-coupling protectors 410. Without limitation, cross-coupling protectors 410 may be evenly spaced and may be disposed on every other joint of production tubing 404. Further illustrated, sensor fiber 312 may be coupled to fiber connection 406 at one end and bottom hole gauge 408 at the opposite end.

FIG. 4D illustrates an example of a coiled tubing operation in which sensor fiber 312 may be deployed temporarily. As illustrated in FIG. 4D, wellbore 122 deployed in formation may include surface casing 400 in which production casing 402 may be deployed. Additionally, coiled tubing 412 may be deployed within production casing 402. In this example, sensor fiber 312 may be temporarily deployed in a coiled tubing system in which a bottom hole gauge 408 is connected to the distal end of downhole fiber. Further illustrated, sensor fiber 312 may be attached to coiled tubing 412, which may move sensor fiber 312 through production casing 402. Further illustrated, sensor fiber 312 may be coupled to fiber connection 406 at one end and bottom hole gauge 408 at the opposite end.

Referring back to FIG. 3, during operations, sensor fiber 312 may be used to take measurements within wellbore 122. Sensor fiber 312 may comprise an optical fiber which naturally produces Rayleigh backscatter light based on its glass/waveguide characteristics over the entire length of the optical fiber. In other examples, the optical fiber may be enhanced to produce a controlled level of backscatter light to generally be larger than what is produced by the Rayleigh process by inscription of index of refraction perturbations. These perturbations may be continuous with even spacings along the entirety of the optical fiber, discontinuous skipping certain sections of the optical fiber, randomly distributed over the fiber, or organized to create Fiber Bragg Gratings FBG which may also be organized to be spaced continuously, or discontinuously, or random and configured to backscatter certain wavelength ranges, or certain multiple different wavelength ranges. Wavelength ranges may comprise optical wavelengths in the C band which may range from 1527 nm to 1570 nm. Additionally, in examples, wavelengths may also utilize about0 1310 nm and about 1060 nm wavelengths. The distributed backscatter light within sensor fiber 312 reflects from all locations along the sensor fiber 312 and traverses up through sensor fiber 312 back to circulator 310. Circulator 310 may direct the backscatter light to return optoelectronics 304.

Return optoelectronics 304 may comprise one or more components that may create quadrature signals (either optical or electrical), or generally set up a PM or FM demodulation process and optical receivers. These can be either direct, single input type receivers or "balanced" (dual input) receivers. Additionally, return optoelectronics 304 may comprise one or more Wavelength Division Multiplexers (WDMs) may be used to combine all the wavelengths onto one optical fiber. If DAS 300 utilizes a pulsed system, pulse forming elements may be utilized to create high (on-off) extinction optical pulsing. This may be performed by semiconductor optical amplifiers (SOA) which are driven with electronic current pulses or Acoustic Optical Modulators (AOM) or fast optical switches which are driven with electrical voltage pulses. Additionally, return optoelectronics 304 may comprise optical phase or frequency modulators which may be driven with electrical modulation signals which in turn are converted to optical modulation signals. These devices may be in-line or incorporated with splitters and recombiners to effectuate optical modulation functions which incorporate the an interrogation strategy. Many designs also incorporate optical amplifiers which are usually Erbium. Further, directly prior to launch there may be optical splitters, and circulators which multiplex the outbound in backscatter light to their respective optical propagation paths.

During operations, return optoelectronics 304 may operate and function to by taking backscatter light and passing it through an optical amplifier, optional, then passing the backscatter light through an optical compensation/modulation network (in line or split and recombined path), optionally breaking out waveforms with a WDM for demux which also includes quadrature setup, and finally passing the backscatter light or wavelengths of the backscatter light through optical receivers. This may allow for the backscatter light or wavelengths to be processed.

The output from return optoelectronics 304 may be transmitted to a digital acquisition (DAQ) and processor 306. DAQ and processor 306 may comprise multi-channel analog to digital converters, operating time synchronous and in parallel to receive outputs from return optoelectronics 304, convert the data to digital data streams, and communication protocol for transmitting a continuous data stream to a processing device, which are processed by information handling system 146. Information handling system 146 may process the data from Return optoelectronics 304 and perform one or more actions with the data to produce information that personnel may utilize to alter and/or change ongoing measurement operations.

Figure 5A:
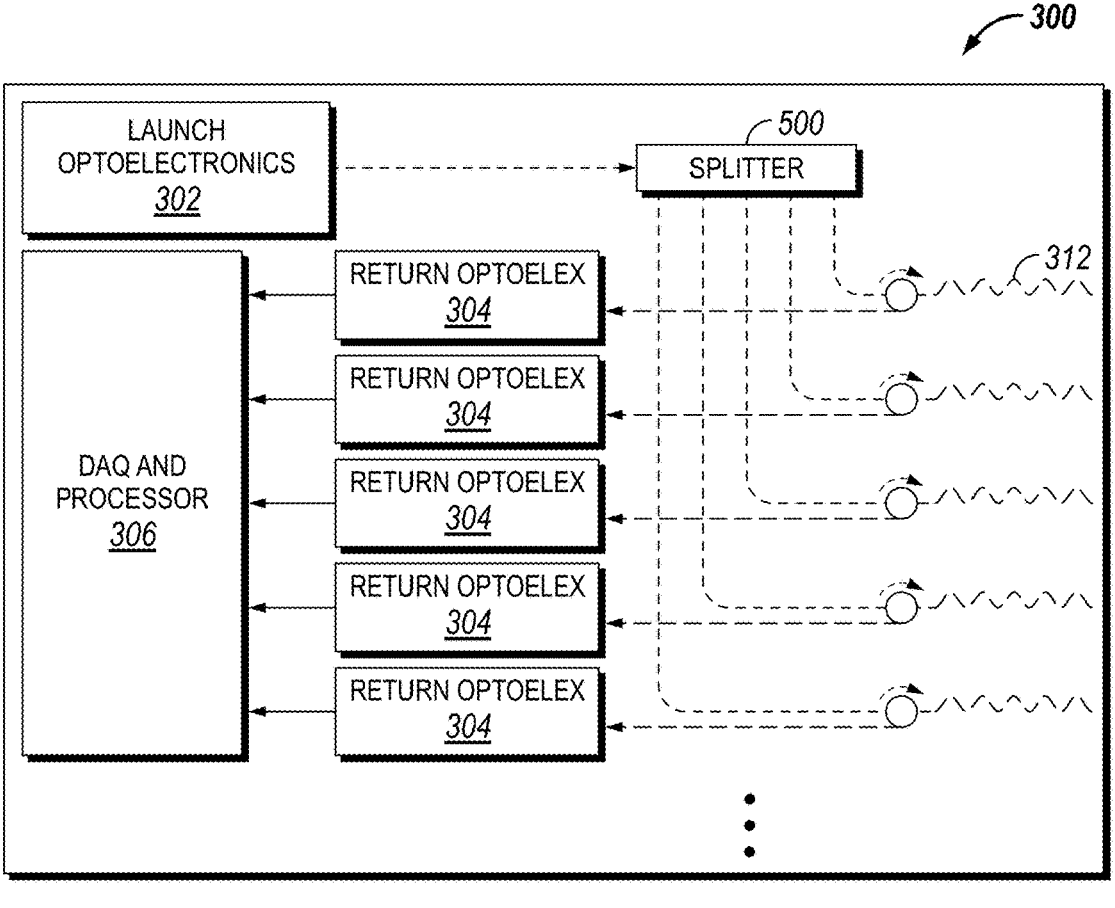
FIGS. 5A-5E illustrate the DAS with for noise cancellation.

FIG. 5A illustrates another example of DAS 300 in which a splitter 500 may be utilized. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 have its own circulator 310. This may allow for a single launch optoelectronics 302 to service a plurality of sensor fibers 312. As light pulses 308 pass through circulator 310 they may enter sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along sensor fiber 312 and traverse up through sensor fiber 312 to circulator 310. As there are multiple circulators 310, each circulator 310 may then direct the backscatter light to an individual return optoelectronics 304. In examples, not illustrated, each circulator 310 may be connected to a single return optoelectronics 304. Return optoelectronics 304 may operate and function as described above. The output from return optoelectronic 304 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

Figure 5B:
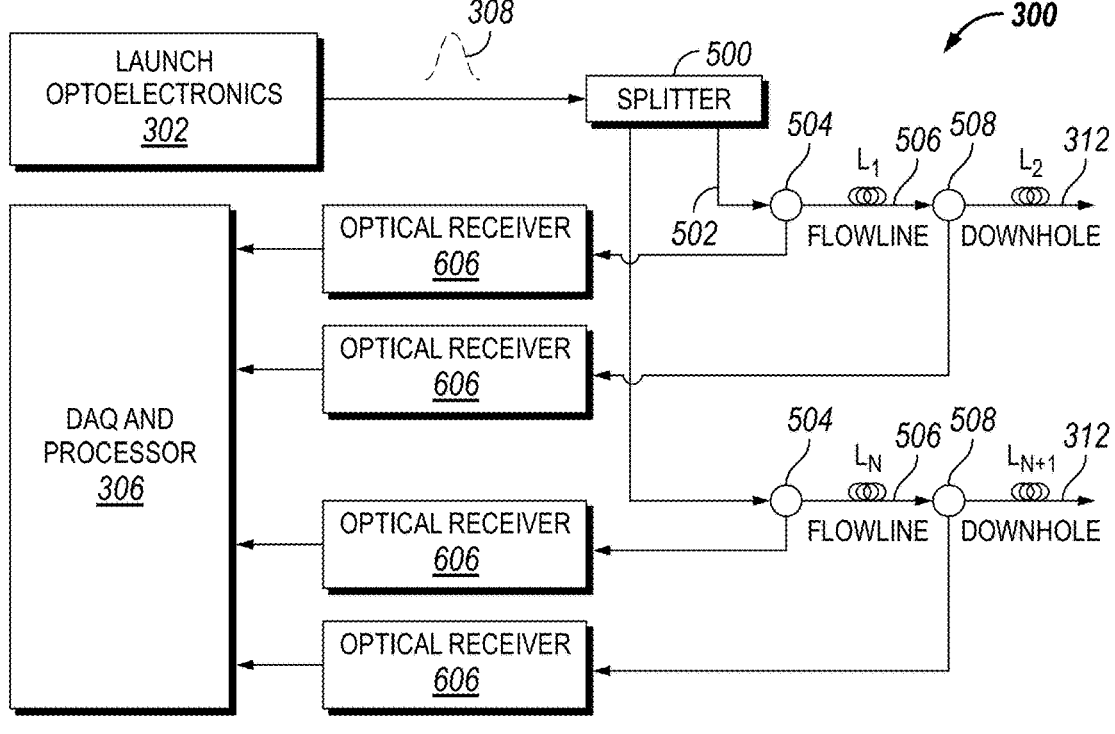

FIG. 5B illustrates another example of DAS 300 for use in a subsea environment. For Subsea Umbilical Risers Flowline ("SURF") and downhole infrastructure may utilize DAS 300 for various sensing applications. Riser movement, dynamic strain, flow line flow allocation and flow regime identification, flow assurance, sand slug detection, integrity monitoring, ocean floor seismic, downhole flow allocation, ESP monitoring, gas lift monitoring, downhole flow regime identification, Vertical Seismic Profiling (VSP), micro-seismic, conventional reflection seismic and downhole integrity monitoring etc. During measurement operations, measurements of the full flow path from the reservoir to the surface may be performed. During measurement operation, a plurality of measurements may be taken which may utilize different sensing configurations.

As illustrated, launch optoelectronics 302 may emit one or more light pulses 308 that may traverse to a circulator 310 by an optical fiber. Light pulses 308 may be formed for specific measurement operations. For examples, a low frequency DAS strain measurement may be used for detecting various changes in flow conditions with signals below. Thus, light pulses may be 10 Hz or in some instances below 1 Hz or even below 0.1 Hz. Measurement operations for micro-seismic data may reside in the 10 Hz to 500 Hz and more particularly between 30 Hz to 100 Hz, whereas a VSP survey or a seismic survey may be optimized between 6 Hz to 150 Hz or more likely coordinated with the vibrational source frequency content of 10-100 Hz or in some instances higher frequency content when used with air gun sources. One launch optoelectronics 302 may be used to simultaneously measure broadband data for multiple applications simultaneously and the signal processing path may different for the different applications and likewise the gain and SNR profile may be tailored to each different application. The time constant for a low frequency strain application targeting data below 1 Hz would be significantly different from a micro-seismic survey targeting data up to 500 Hz. As illustrated, light pulses 308 from launch optoelectronics 302 may traverse to splitter 500 by an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a proximal circulator 504. Proximal circulator 504 may operate and function as circulator 310 (e.g., referring to FIG. 3). Thus, each optical output from splitter 500 has its own proximal circulator 504. This may allow for a single launch optoelectronics 302 to service a plurality of sensor fibers 312. As light pulses 308 pass through circulator 310 they may enter flowline 506 using a fiber optic cable disposed within flowline 506 and connects proximal circulator 504 to distal circulator 508. Flowline 506 may be used to transport hydrocarbons from the subsea wells to the production facilities on a rig or a floating production storage and offloading (FPSO) vessel. Flow lines may be pipes or flexible conduits that may transport fluids and/or gases to/from subsurface infrastructure like e.g., wells and processing facilities. Flow lines may be used between individual wells and subsea or surface gathering/processing facilities and between onshore/offshore storage facilities. Some facilities may reside on rigs or on Floating Production Storage and Offloading (FPSO) vessels. Applications include fluid injection, offshore fracturing, gravel pack operations, fluid production, acidizing operations or any other application related to fluid transport.

In examples, flowline 506 may operate and function to transport hydrocarbons over a wide range of pressures and temperature where e.g., solution gas, gas hydrates, wax, asphaltenes sand and multiphase flow conditions may vary along the length of a flow line over time and over production condition. Wax and asphaltene buildup may locally occur due to changes in pressure, temperature and flow conditions with associated changes in flow velocities or acoustic properties across variations of the inner diameter and/or surface properties of the flow line. Solution gas may similarly occur at various points along the flow line and at different rates depending on production fluid chemical composition, fluid flow rates, pressures and temperatures. Solution gas may change flow conditions where the solution gas may be dispersed as small bubbles or larger bubbles or may form to e.g., gas slugs along the flow line where each flow condition may have a characteristic signature that can be monitored with the DAS system. Production of Hydrocarbons may be temporarily halted due to surface processing facility upsets in which case gas hydrates may start to form in the flow lines. Wax, asphaltene, gas hydrates and other chemical reactions may be mitigated using chemical injection, heating of flow lines, control of pressure and/or production rates. Flow line integrity may also be monitored where the objective is to find leak signatures where localized acoustic energy may be different than the normal baseline flow signature. Longer spatial and temporal measurement windows may enable detection of smaller average signal variations whereas accurate spatial resolution and event characterization may utilize shorter measurement windows where spatial resolution may be controlled by varying DAS system laser settings like e.g., DAS laser pulse width and DAS system gauge length. Information handling system 146 may be configured to generate a measurement matrix with varying system settings to characterize events where the system may be trigged to characterize events when signature events and/or thresholds are exceeded or to be manually triggered. Events may be classified as a function of amplitude vs. frequency content, spatial characteristics, frequency and amplitude changes vs. flow rates, time, pressure or temperature, injection and production rates of nearby wells etc. All of these flowline events will have different acoustic signatures that can be detected with DAS systems by measuring time series data that can be displayed in water fall plots, i.e. acoustic intensity vs. time and depth, or the time series data can be converted into frequency domain data that can be viewed as amplitude vs. frequency for a given depth and time in order to display how downhole events evolve over time. Flow lines may be used for hydrocarbon production, water injection, CO2 sequestration, geothermal energy production, natural gas storage or hydrogen storage applications. Backscatter light created within flowline 506 may traverse back to proximal circulator 504. Proximal circulator 504 may then guide backscatter light to optical receiver 606. Optical receiver 606 may operate and function as described above. The output from optical receiver 606 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

In examples, light pulses 308 may pass through flow line 506 to distal circulator 508. Distal circulator 508 may operate and function as circulator 310. Light pulses 308 may pass through distal circulator 508 to sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along sensor fiber 312 and traverse up through sensor fiber 312 to distal circulator 508. As there are multiple distal circulators 508, each distal circulator 508 may then direct the backscatter light to an individual optical receiver 606. In examples, not illustrated, each distal circulator 508 may be connected to a single optical receiver 606. Optical receiver 606 may operate and function as described above. The output from optical receiver 606 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

Figure 5C:
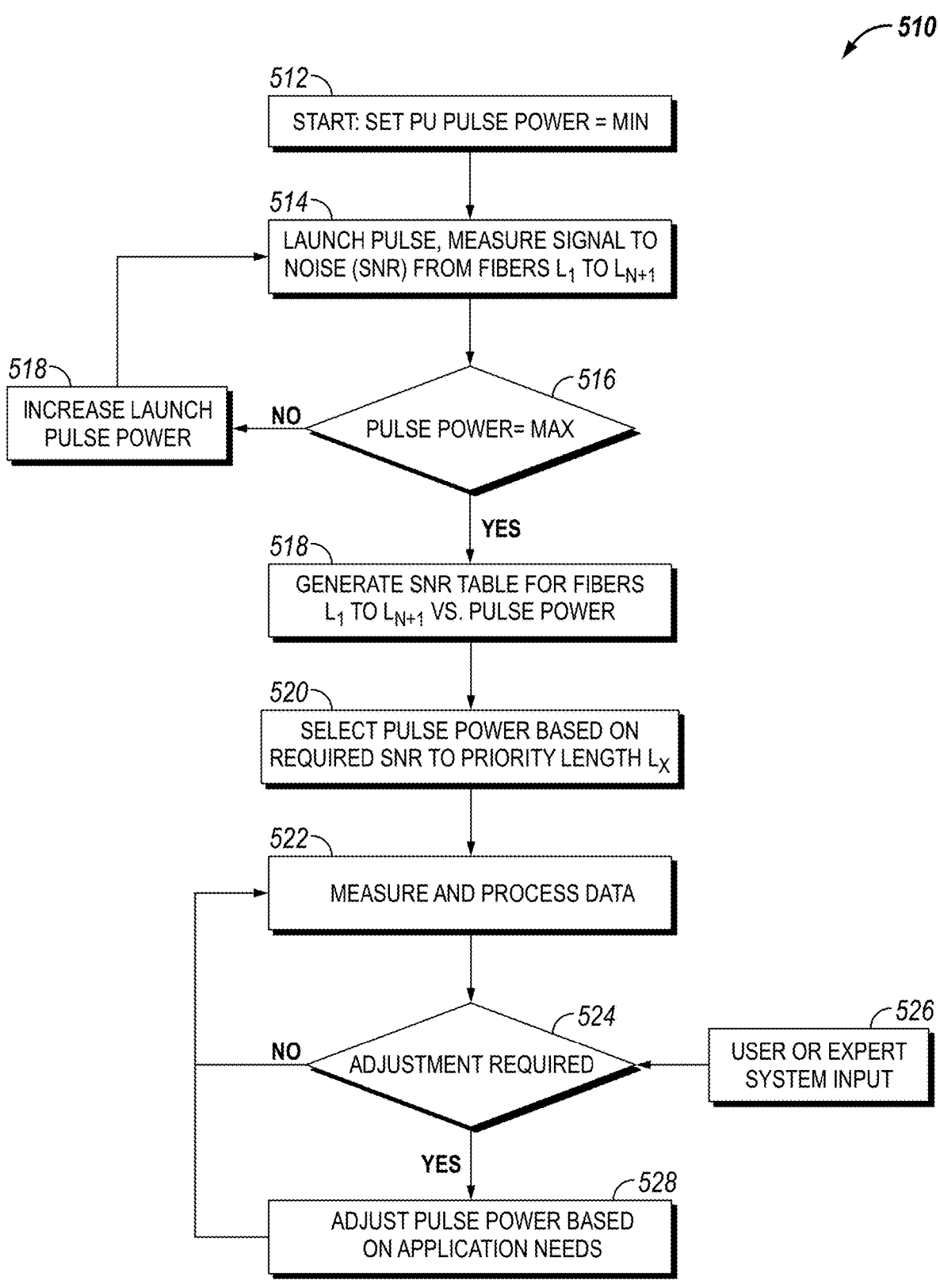

FIG. 5C illustrates a workflow 510 for adjusting pulse power of light pulses 308 from launch optoelectronics 302. In examples, at least a part of workflow 510 may be performed on or controlled by information handling system 146. Workflow 510 may begin with block 512 in which the set pulse power for light pulses 308 is set at a minimum power for launch optoelectronics 302. Thus, light pulses 308 may transmit from launch optoelectronics 302 at the minimum power. In block 514, light pulses 308 may traverse through DAS 300 (e.g., referring to FIG. 5B). In block 514, a signal to noise ratio (SNR) is measured within each flowline 506 (as noted above, flowline may comprise a fiber optic cable, a gain fiber, or a combination of both within flowline 506) and sensing fiber 312. The signal to noise ratio may be measured by knowing flow disturbances or acoustic signal generator in the flow line or wellbore where we know we will have a flow related event or completion/flow related flow disturbance that may be used as a signal generator in order to verify that the system is optimally configured for a given fiber length. Examples may comprise variations to the well completion inner diameter (ID) or flow line ID, various inflow control valves and in particular if fluid properties, temperature, pressure, pressure differential across an orifice or flow rate is known at a given point then the acoustic signature may be known or follow known models, gas lift mandrels may generate flow disturbances and will also have a known acoustic signature during operation given that the mechanical dimensions like orifice size and shape are known and the gas lift pressure is controlled/known. In blocks 516 and 518, the power may be increased incrementally and transmitted through light pulses 308 until the max power allowed by launch optoelectronics 302 is reached. Once the max power is reached in block 516, the measurements may be processed.

In block 518, an SNR table may be generated for measurements taken at each flowline 506 and sensing fiber 312. Specifically, the SNR table may be populated based on the corresponding power of light pulses 308 that were utilized for the measurements. For example, there may be a measurement for each increment of pulse power for light pulse 308 that was created in blocks 512-516. These increments may be listed on the SNR table. This table may be utilized to select specific power for light pulses 308. In block 520, pulse power for light pulses 308 may be selected based at least in part on the SNR for a selected length of optical fiber across flowline 506 and sensing fiber 312. This selected power for light pulses 308 may be utilized to measure and process data in block 522 for identified length of optical fiber in block 520. Measurements and processing may be performed by information handling system 146. Information handling system 146 may be configured to generate a measurement matrix with varying system settings to characterize events where the system may be trigged to characterize events when signature events and/or thresholds are exceeded or to be manually triggered. Events may be classified as a function of amplitude vs. frequency content, spatial characteristics, frequency and amplitude changes vs. flow rates, time, pressure or temperature, injection and production rates of nearby wells etc. All of these flowline events will have different acoustic signatures that can be detected with DAS systems by measuring time series data that can be displayed in water fall plots, i.e. acoustic intensity vs. time and depth, or the time series data can be converted into frequency domain data that can be viewed as amplitude vs. frequency for a given depth and time in order to display how downhole events evolve over time. Events may be compared with known events stored in a data based where processing may include using an algorithm to compare frequency content with one or more known events while varying the amplitude of said event(s) until a match has been identified or the algorithm time out. Output from the algorithm could be one or more identified events with a percentage match in terms of frequency and amplitude content and/or a confidence value of how well the algorithm matched the event(s). It should be noted that processing of measurements may be performed at least in part on information handling system 146. In block 524 it may be determined if an adjustment may be made. An adjustment may be made if a known event is identified that may be better classified with different DAS system settings, such as a better spatial resolution or higher pulse repetition rate of the laser pulses if the event is located on a short fiber or pulse power may be varied if the identified event can be better identified without having the pulse power for the region of interest exceed non-linear fiber thresholds. There may also be instances where fiber degradation happens over time due to e.g., Hydrogen induced fiber attenuation, and it may be necessary to change laser pulse power, pulse width, system gauge length, and/or the like. If an adjustment in block 524 may be made, the adjustment may be based at least in part on personnel or expert system input from block 526 and/or the pulse power of light pulse 308 may be adjusted for application needs in block 528. Once the adjustments have been made, measurements and data processing block 522 may be performed again, until all measurements have been made. The proposed optical architecture and control scheme in FIGS. 5B and 5C enables a scalable and automatic approach for measuring data from different applications along the subsea infrastructure.

Figure 5D:
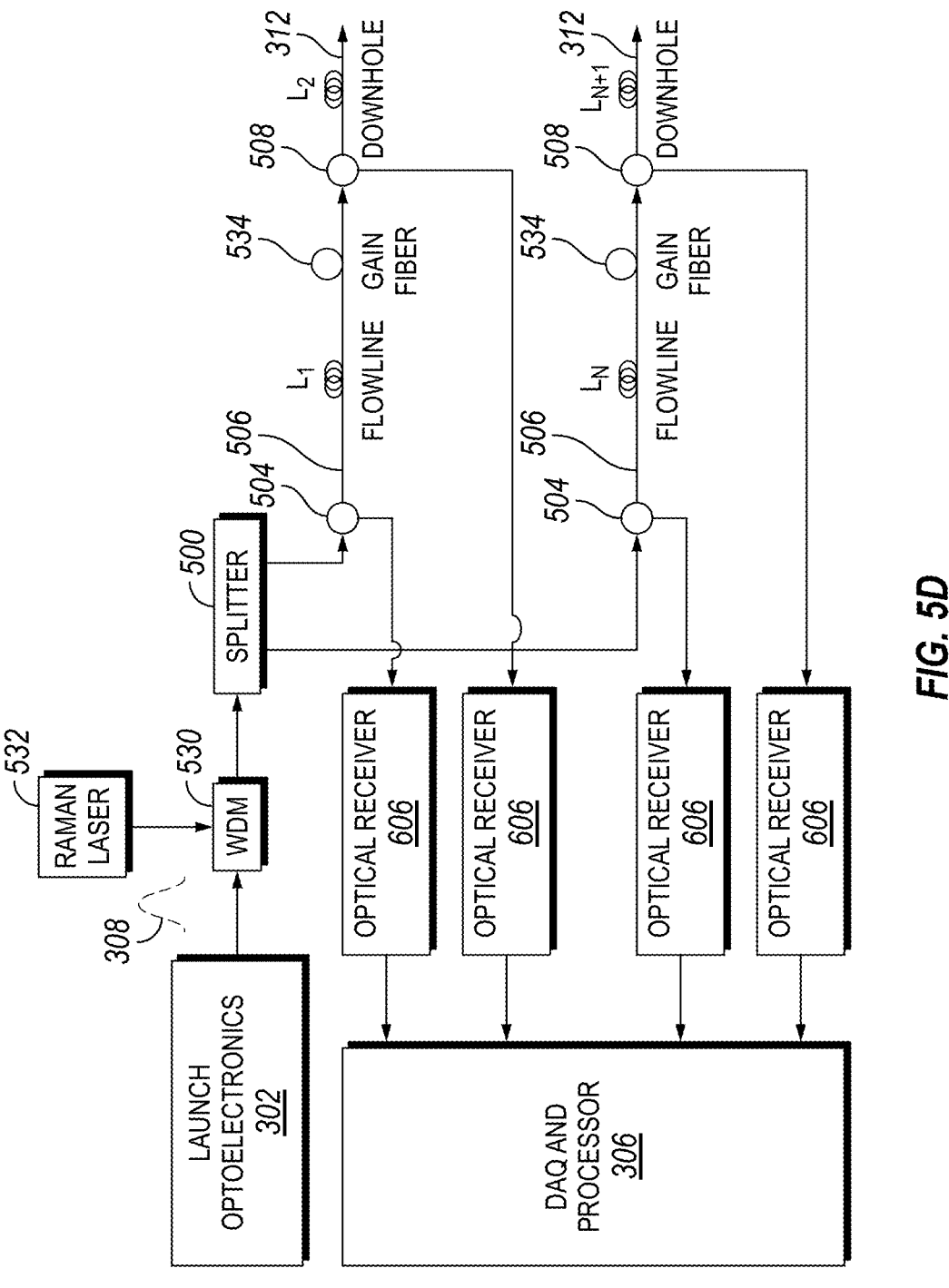

It is in many instances also desirable to enable extended reach applications where additional gain may be provided in order to increase the sensing distance and SNR. FIG. 5D illustrated below comprises a Raman signal amplification and/or remote gain elements for increased sensing distance and SNR.

FIG. 5D illustrates another example of DAS 300 in which the sensing distance and SNR may be increased for use in a subsea environment. As noted above, SURF and downhole infrastructure may utilize DAS 300 for various sensing applications. Riser movement, dynamic strain, flow line flow allocation and flow regime identification, flow assurance, sand slug detection, integrity monitoring, ocean floor seismic, downhole flow allocation, ESP monitoring, gas lift monitoring, downhole flow regime identification, Vertical Seismic Profiling (VSP), micro-seismic, conventional reflection seismic and downhole integrity monitoring etc. The system and methods described below may allow for increased sensing distance and SNR to measure the full flow path from the reservoir to the surface.

As illustrated, launch optoelectronics 302 may emit one or more light pulses 308 that may traverse to a circulator 310 by an optical fiber. Light pulses 308 may be formed for specific measurement operations. For examples, a low frequency DAS strain measurement may be used for detecting various changes in flow conditions with signals below. Thus, light pulses may be 10 Hz or in some instances below 1 Hz or even below 0.1 Hz. Measurement operations for micro-seismic data may reside in the 10 Hz to 500 Hz and more particularly between 30 Hz to 100 Hz, whereas a VSP survey or a seismic survey may be optimized between 6 Hz to 150 Hz or more likely coordinated with the vibrational source frequency content of 10-100 Hz or in some instances higher frequency content when used with air gun sources. One launch optoelectronics 302 may be used to simultaneously measure broadband data for multiple applications simultaneously and the signal processing path may different for the different applications and likewise the gain and SNR profile may be tailored to each different application. The time constant for a low frequency strain application targeting data below 1 Hz would be significantly different from a micro-seismic survey targeting data up to 500 Hz. As illustrated, light pulses 308 from launch optoelectronics 302 may traverse to instruments that may increase the distance and SNR for light pulses 308 within DAS 300.

Specifically, light pulses 308 may enter into a wavelength division multiplexer (WDM) 530. WDM 530 may be used to optically combine or separate individual wavelengths into a single combined light pulse 308 or one or more single combined light pulses 308. Light pulses 308 may further be amplified by Raman Laser 532. As illustrated, Raman Laser 532 may amplify light pulses 308 by a Raman amplification process. The amplified light pulses 308 may exit WDM 530 as an output and traverse to splitter 500 by an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a proximal circulator 504. Proximal circulator 504 may operate and function as circulator 310 (e.g., referring to FIG. 3). Thus, each optical output from splitter 500 have its own proximal circulator 504. This may allow for a single launch optoelectronics 302 to service a plurality of sensor fibers 312. As light pulses 308 pass through circulator 310 they may enter flowline 506. The sensing fibers in the flow lines and down hole fibers may be used to collect seismic data like Vertical Seismic Profiling (VSP) or reflection seismic where seismic sources may periodically be lowered from a rig or a supply vessel or towed behind a seismic vessel for better seismic coverage. The DAS systems and seismic sources would be GPS time synchronized to enable accurate processing. The benefit of using fibers in flow lines and downhole would provide better arial coverage of the subsurface domain while enabling efficient use of seismic waves that are both reflected of various subsurface strata and transmitted waves. Similarly, the sensing fibers in flow lines and downhole may also be used to accurately triangulate microseismic events during subsurface fracturing, gravel pack deployment and cap rock integrity events during fluid injection where the fluid may be water, natural gas in storage caverns, hydrogen in storage cavers, $CO_2$ in disposal wells, $CO_2$ in geothermal wells or other fluid injection applications. Additionally, within flowline 506 a gain fiber 534 may be utilized. As noted above, a fiber optic cable may be disposed within flowline 506. The fiber optic cable may optically connect proximal circulator 504 to distal circulator 508. In examples, this fiber optic cable is gain fiber 534. In other examples, gain fiber 534 may split the fiber optic cable into two separate fiber optic cables. Gain fiber 534 may comprise backscatter enhanced fiber. In examples, gain fiber 534 may operate and function as described above. Gain fiber 534 may have a range of improvement from two to four times backscatter or one hundred times backscatter. Backscatter light created within flowline 506 may traverse back to proximal circulator 504. Proximal circulator 504 may then guide backscatter light to optical receiver 606. Optical receiver 606 may operate and function as described above. The output from optical receiver 606 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

In examples, light pulses 308 may pass through flow line 506 to distal circulator 508. Distal circulator 508 may operate and function as circulator 310. Light pulses 308 may pass through distal circulator 508 to sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along sensor fiber 312 and traverse up through sensor fiber 312 to distal circulator 508. As there are multiple distal circulators 508, each distal circulator 508 may then direct the backscatter light to an individual optical receiver 606. In examples, not illustrated, each distal circulator 508 may be connected to a single optical receiver 606. Optical receiver 606 may operate and function as described above. The output from optical receiver 606 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

Figure 5E:
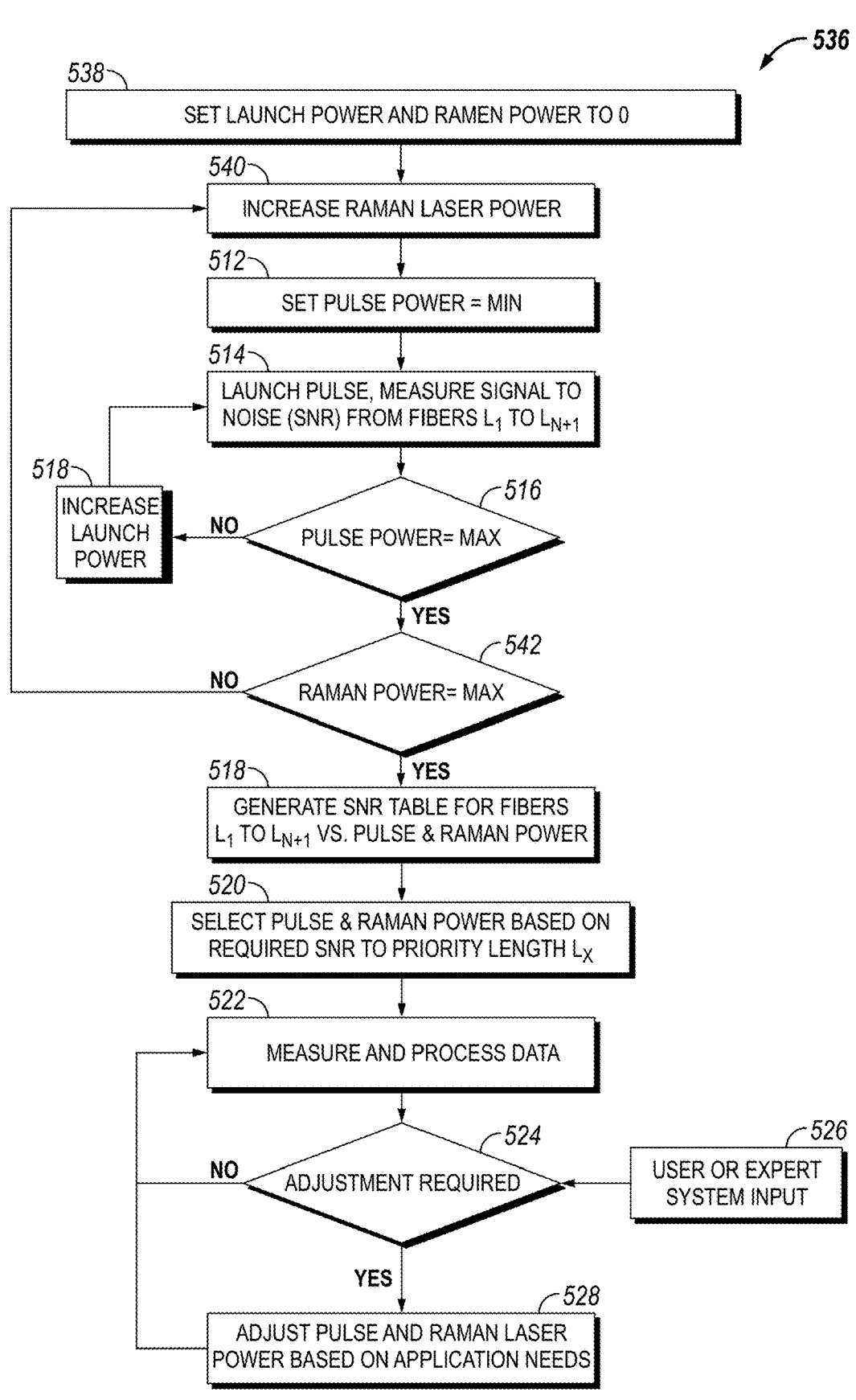

FIG. 5E illustrates a workflow 536 for adjusting pulse power of light pulses 308 from launch optoelectronics 302 and increasing the distance and SNR of the light pulses 308 with Raman Laser 532. In examples, at least a part of workflow 510 may be performed on or controlled by information handling system 146. Workflow 536 may begin with block 538 in which launch power of continuous wave (CW) light from laser 600, discussed below, and Raman Laser power is set to 0. It should be noted that blocks 538 and 512, discussed below, may be performed simultaneously. In block 540, power to Raman Laser 532 may be increased incrementally at a pre-determined rate until Raman Laser 532 reaches max power in block 542. Further blocks 540 and 518 may be performed simultaneously. In block 512, the pulse power for light pulses 308, set by a pulser or modulator, discussed below, is set at a minimum power for launch optoelectronics 302. Thus, light pulses 308 may transmit from launch optoelectronics 302 at the minimum power. In block 514, light pulses 308 may traverse through DAS 300 (e.g., referring to FIG. 5B). In block 514, a signal to noise ratio (SNR) is measured within each flowline 506 and sensing fiber 312. The signal to noise ratio may be measured as described above. In blocks 516 and 518, the power may be increased incrementally and transmitted through light pulses 308 until the max power allowed by launch optoelectronics 302 is reached. Once the max power is reached in block 516, the measurements may be processed.

In block 518, an SNR table may be generated for measurements taken at each flowline 506 and sensing fiber 312. Specifically, the SNR table may be populated based on the corresponding power of light pulses 308 and the power of Raman Laser 532 that were utilized for the measurements. For example, there may be a measurement for each increment of pulse power for light pulse 308 that was created in blocks 512-516. These increments may be listed on the SNR table. This table may be utilized to select specific power for light pulses 308. In block 520, pulse power for light pulses 308 and power for Raman Laser 532 may be selected based at least in part on the SNR for a selected length of optical fiber across flowline 506 and sensing fiber 312. This selected power for light pulses 308 may be utilized to measure and process data in block 522 for identified length of optical fiber in block 520. Measurements and processing may operate and function as described above. It should be noted that processing of measurements may be performed at least in part on information handling system 146. In block 524 it may be determined if an adjustment may be made. An adjustment may be made if the conditions are met as described above. If an adjustment in block 524 may be made, the adjustment may be based at least in part on personnel or expert system input from block 526 and/or the pulse power of light pulse 308 and power of Raman Laser 532 may be adjusted for application needs in block 528. Once the adjustments have been made, measurements and data processing block 522 may be performed again, until all measurements have been made.

The system may also optimize the pulse repetition rate for any given fiber length Lx and apply that as part of the process to generate the SNR table in block 518, and the application specific adjustment may include varying the laser pulse repetition rate. Some of the fibers may be enhanced back scatter fiber and the optical receiver gain setting may differ based on signal back scatter levels.

Figure 6:
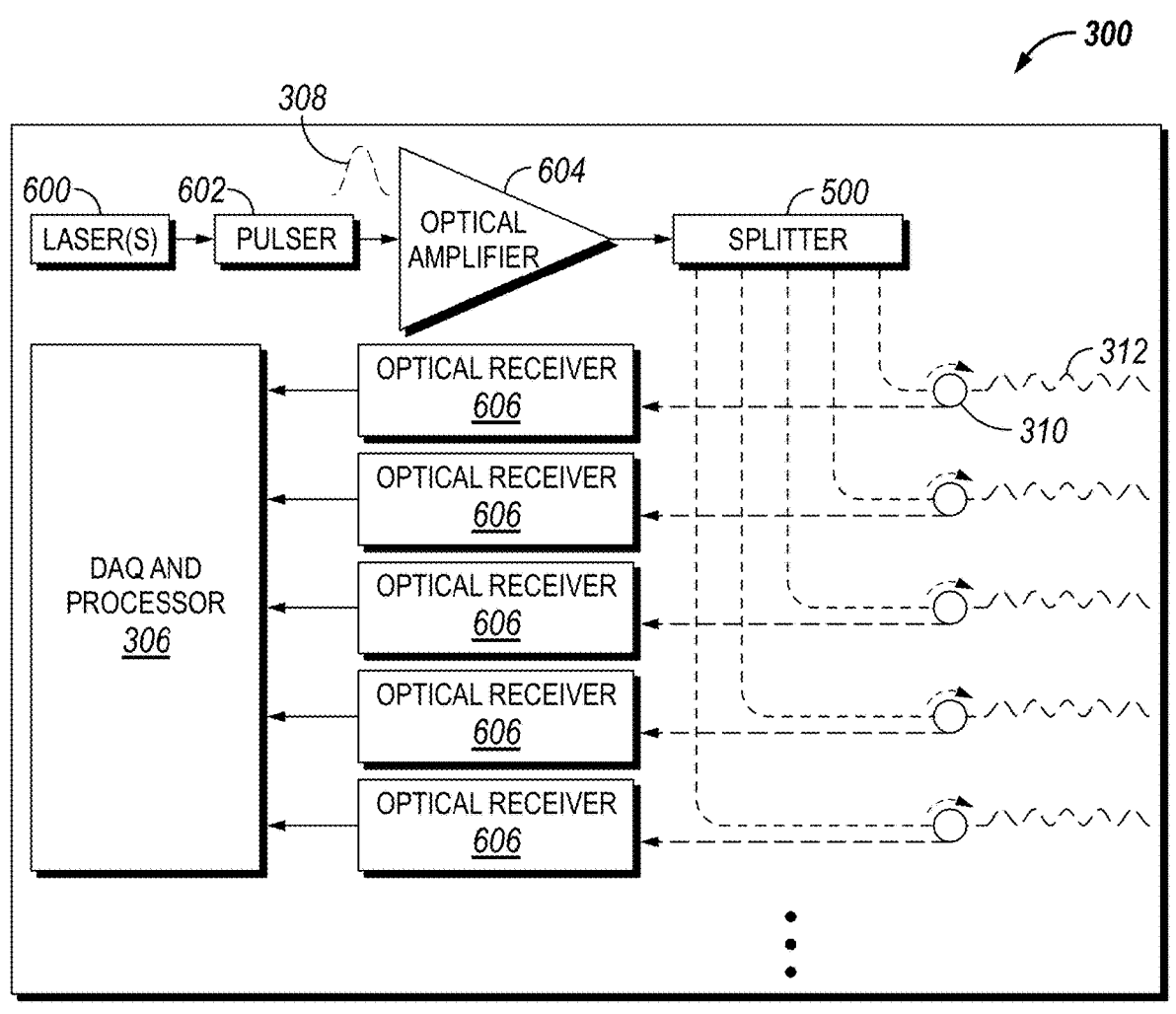
FIGS. 6-13 illustrate other examples of the DAS.

FIG. 6 illustrates another example of DAS 300 in which a laser 600 may produce a continuous wave (CW) laser light, that may traverse through DAS 300. The CW laser light (fiber pigtail) may traverse from laser 600 to pulser 602 through an optical fiber to pulser 602. Pulser 602 may receive the CW laser light as input and implements a high-speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to an optical amplifier 604 by another optical fiber.

Optical amplifier 604 is an active device which creates optical gain. In examples, optical amplifier 604 may receive light pulses as inputs (fiber pigtailed) and create an optical amplified output. Optical amplifiers 604 may be an Erbium Doped Fiber Amplifiers (EDFA) or Semiconductor Optical Amplifiers (SOA). The output from optical amplifier 604 may traverse to splitter 500. Splitter 500 may operate and function as described above. As illustrated, there may be any number of optical outputs from splitter 500.

Each of the optical outputs may be connected by an optical fiber 502 to a circulator 310. Thus, each optical output from splitter 500 has its own circulator 310. This may allow for a single launch optoelectronics 302 to service a plurality of sensor fibers 312. As light pulses 308 pass through circulator 310 they may enter sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Ad there are multiple circulators 310, each circulator 310 may then direct the backscatter light to an individual return optoelectronics 304. In examples, not illustrated, each circulator 310 may be connected to an optical receiver 606. Optical Receivers 606 may comprise a fiber coupled input to a reverse biased PIN photodiode to convert incident light to electrical current and integrated to an electronic conversion circuit. A PIN photodiode is a semiconductor design, where there is a P-doped region and a N-doped region which is separated by an intrinsic undoped I region separating the P and N regions. This type of design may allow for increased photodetection and is known for it by using the acronym PIN. The electronic conversion circuit may allow for the production of voltages and also amplify the voltages suitable to voltage levels compatible with digital acquisition. Bandwidths for these devices which may range from 20 MHz to 1 1 GHz.

The output from optical receivers 606 may be sent to DAQ and processor 306. DAQ and processor 306 may function and operate as described above. Information handling system 146 may process the receive the data from optical receivers 606 and perform one or more actions with the data to produce information that personnel may utilize to alter and/or change ongoing measurement operations.

Figure 7:
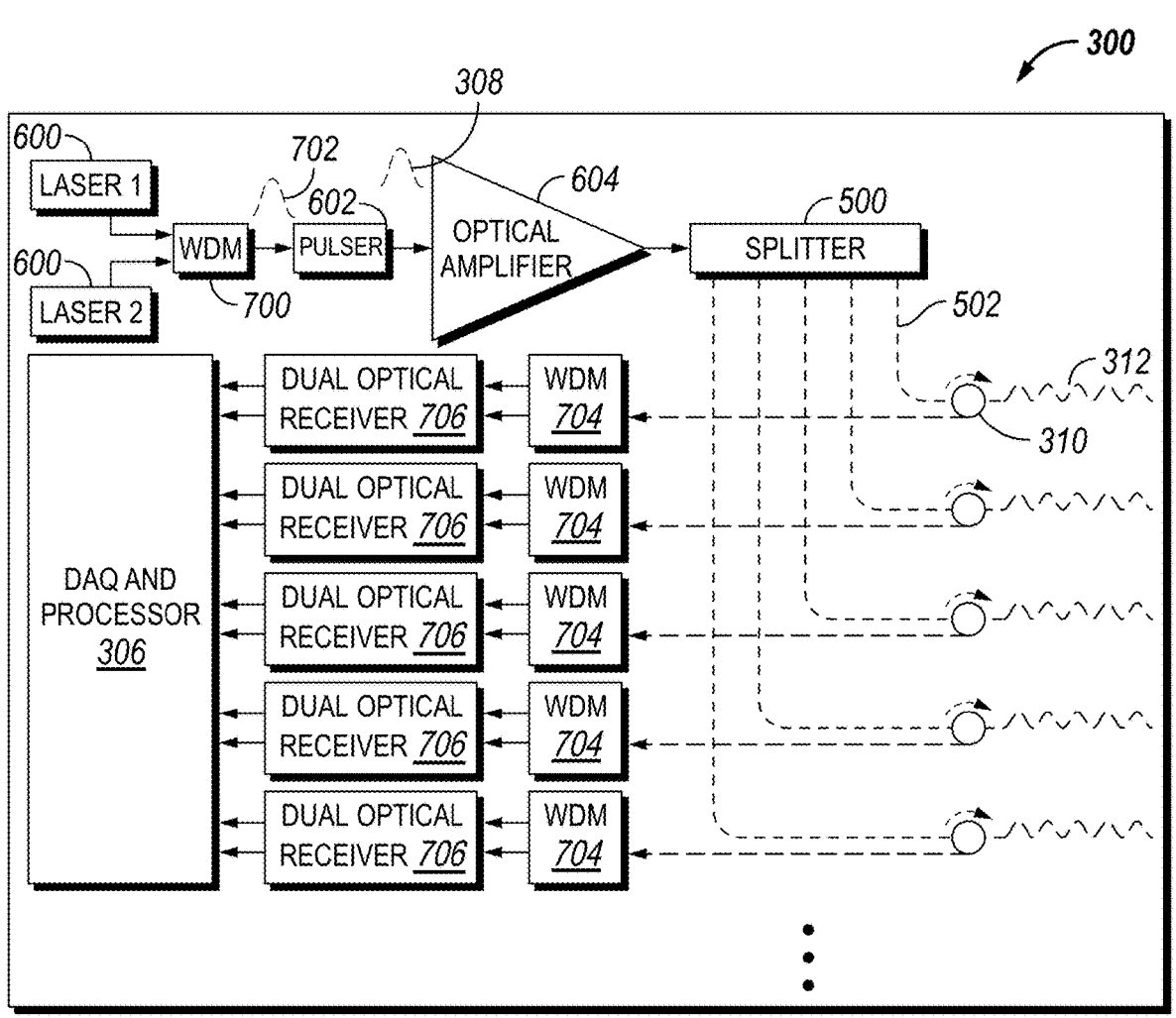

FIG. 7 illustrates another example of DAS 300. As illustrated, two or more lasers 600 may each originate a single linewidth, high stability, continuous wave devices with high coherence, where light exits through a fiber optic pigtail. The light pulse from each laser 600 may traverse to a wavelength division multiplexer (WDM) 700. WDM 700 may be used to optically combine or separate individual wavelengths into a single combined light 702 or one or more separate single combined light wavelengths. Single combined light 702 may move from WDM 700 to pulser 602 through another optical fiber. Pulser 602 is a device that may receive singe combined light 702 and/or a CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to an optical amplifier 604 by another optical fiber.

The output from optical amplifier 604 may traverse to splitter 500. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 has its own circulator 310. This may allow for a one or more lasers 600 to service a plurality of sensor fibers 312. As light pulses 308 pass through circulator 310 they may enter sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. As there are multiple circulators 310, each circulator 310 may then direct the backscatter light to a receiving WDM 704. In examples, not illustrated, each circulator 310 may be connected to a single receiving WDM

704. A receiving WDM 704, the backscatter light may be broken out into different wavelengths that originated from each laser 600. Individual wavelengths separated by WDM 704 may traverse to a dual optical receiver 706 by an optical fiber. For each figure utilizing dual optical receiver 706, such as FIG. 7, it should be noted that dual optical receiver 706 is a simplified block that represents two individual optical receivers 606. Each optical receiver 606 of dual optical receiver 706 may handle a specific wavelength input.

The output from dual optical receiver 706 may be sent to DAQ and processor 306. DAQ and processor 306 may function and operate as described above. Information handling system 146 may process the receive the data from return optoelectronics 304 and perform one or more actions with the data to produce information that personnel may utilize to alter and/or change ongoing measurement operations.

Figures 8, 9:
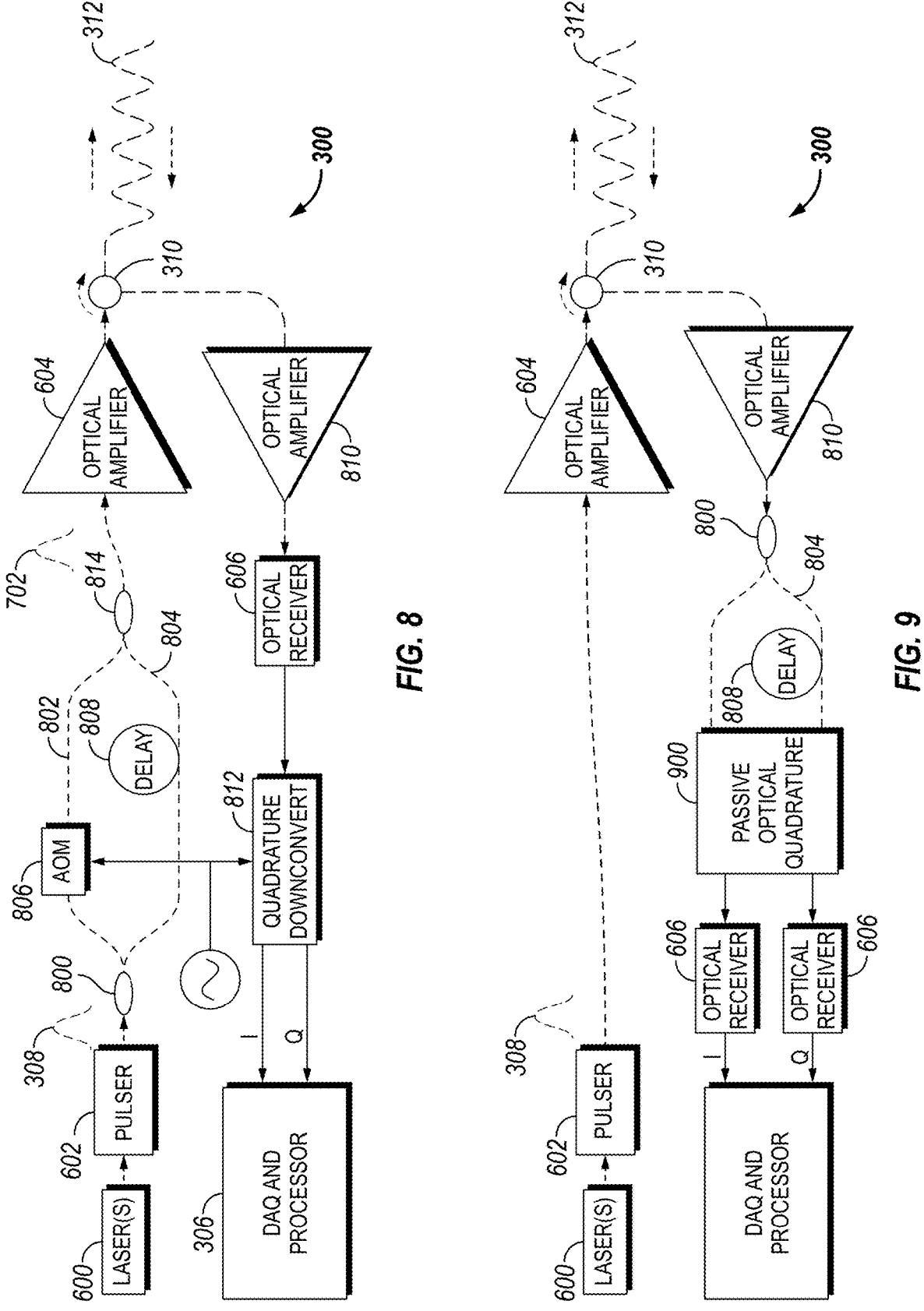

FIG. 8 illustrates another example of DAS 300. In this example DAS 300 may be phase sensitive by utilizing a launch delay to form a dual pulse heterodyne. As illustrated, a laser 600 or a plurality of lasers 600 may be utilized. Laser 600 may be a single linewidth, high stability, continuous wave devices with high coherence, where light exits through a fiber optic pigtail. The CW light from laser 600 may traverse to pulser 602 through an optical fiber. Pulser 602 is a device that may receive the CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to coupler 800. A coupler 800 may be a traditional fused type fiber optic splitter, a circulator, a PLC fiber optic splitter, fiber coupler, and/or any other type of splitter known to those with ordinary skill in the art. As illustrated, coupler 800 may split the light pulse into a first light pulse that traverses through a first optical fiber 802 and a second light pulse that traverses through a second optical fiber 804. Further, first optical fiber 802 may comprise an acousto-optic modulator (AOM) 806, used both for optical frequency shifting and on/off switching to create frequency shifted optical pulses. In second optical fiber 804, a delay 808 may be added. A delay 808 may be aa length of optical fiber which may be coiled. This optical fiber provides for an approximate time delay of 5 ns per meter. In examples, delay 808 may operate and function to establish a time delay between the two pulses caused by the splitter/recombiner which may implement a gauge length. The first light pulse and the second light pulse may then be combined at second coupler 814. Second coupler 814 may operate and function as coupler 800 but combine the light pulses from first optical fiber 802 and second optical fiber 804 into a combined light 702. Combined light 702 from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through optical amplifier 604, the backscatter light may traverse to optical receiver 606. Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be sent to quadrature downconverter 812 through an optical fiber. It should be noted that the frequency of the backscatter light is the same frequency as the light pulses from AOM 806. Quadrature downhole converter 812 may comprise dual RF downconverters referenced from the frequency to each drive an AOM, one at 0 degrees phase offset and the other at 90 degrees phase offset, and result with output baseband signals which are in quadrature, denoted as I and Q electrical signals. In examples, quadrature downconverter 812 may operate and function to prepare proper inputs for PM demodulation by information handling system 146. Output from quadrature downhole converter 812 may be two quadrature outputs of I and Q, which may be inputs to DAQ and processor 306. It should be noted, for a coherent reference, which is a light pulse 308 formed from a continuation wave (CW) laser, quadrature downhole converter 812 may be replaced by an optical four quadrant hybrid detector. This is due to the coherent reference being an optical homodyne down conversion process instead of an electronic down conversion. DAQ and processor 306 may function and operate as described above Information handling system 146 may process the receive the data from return optoelectronics 304 and perform one or more actions with the data to produce information that personnel may utilize to alter and/or change ongoing measurement operations.

FIG. 9 illustrates another example of DAS 300, In this example DAS 300 may be phase sensitive by, utilizing a receiver delay to form a single pulse homodyne. As illustrated, a laser 600 or a plurality of lasers 600 may be utilized. Laser 600 may be a single linewidth, high stability, continuous wave devices with high coherence, where light exits through a fiber optic pigtail. The CW light from laser 600 may traverse to pulser 602 through an optical fiber. Pulser 602 is a device that may receive the CW laser light (fiber pigtail) as input and implements a high speed switching mechanism which creates fast rise and fall times as short as 1 ns, and provides a high on/off ratio (as high as 1 million to 1) where the pulse width is programmable to create pulses as short as 2 ns and as long as 1 us. The output light is fiber pigtailed. The output from pulser 602 may be a light pulse 308 that may traverse to optical amplifier 604 through an optical fiber.

The output from optical amplifier 604 may traverse to a circulator 310 through an optical fiber. As light pulses pass through circulator 310, they may enter sensor fiber 312, Sensor fiber 312 may be disposed at least partially within a wellbore 122. It should further be noted that circulator 310 may be disposed on surface or within wellbore 122, Sensor fiber 312 may be permanently deployed in a wellbore 122 via single- or dual-trip completion strings, behind casing on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. The backscatter light from optical amplifier 604 may traverse to coupler 800. Coupler 800 may split the light pulse into a first light pulse that traverses through a first optical fiber 802 and a second light pulse that traverses through a second optical fiber 804. The second light pulse may encounter a delay 808 in the second optical fiber 804. The first light pulse and the second light pulse may then be inputs into passive optical quadrature 900. Passive optical quadrature 900 is a passive optical device, sometimes known as a "hybrid" which is specifically tuned for the optical wavelength in use to accept two inputs which are two legs of an interferometer and create two or four quadrature optical outputs. In examples, passive optical quadrature 900 may operate and function to appropriately represent an optical intensity quadrature signals which may be optically received, digitized and PM demodulated in information handling system 146. The first light pulse and second light pulse, after traversing through passive optical quadrature 900 may each traverse to an optical receiver 606.

Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be an I or Q, which may be inputs to DAQ and processor 306. DAQ and processor 306 may function and operate as described above Information handling system 146 may process the receive the data from return optoelectronics 304 and perform one or more actions with the data to produce information that personnel may utilize to alter and/or change ongoing measurement operations.

Figures 10, 11:
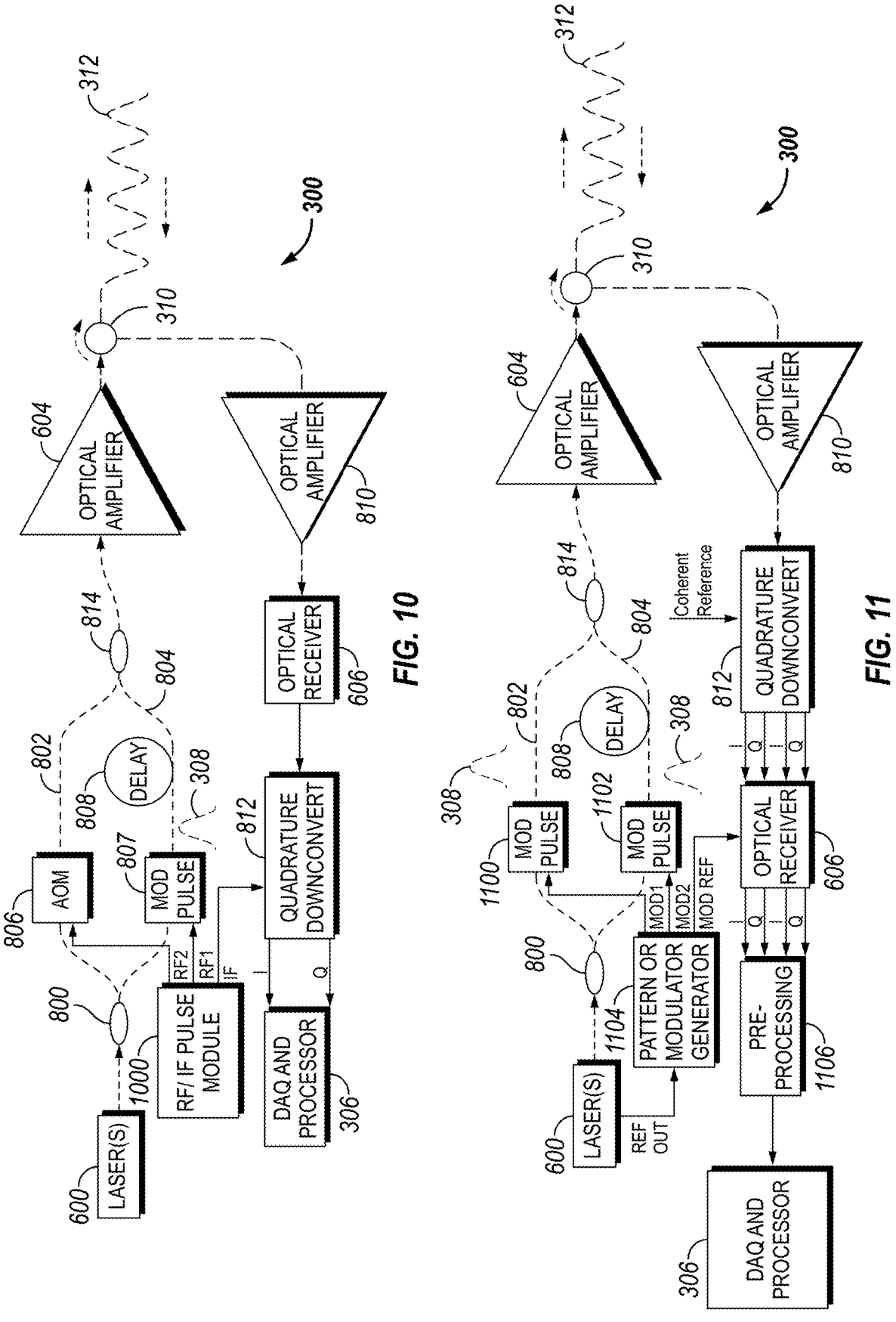

FIG. 10 illustrates another example of DAS 300, in this example DAS 300 may be phase sensitive by utilizing a launch delay to form a dual pulse RF/IF heterodyne. As illustrated, a laser 600 or a plurality of lasers 600 may originate one or more single linewidth, high stability, CW light with high coherence, where the CW light exits from laser 600 and may traverse through DAS 300. The CW light from laser 600 or lasers 600 may traverse to coupler 800. Coupler 800 may split the light pulse into a first light pulse that traverses through a first optical fiber 802 and a second light pulse that traverse through a second optical fiber 804. Further, first optical fiber 802 may comprise an acousto-optic modulator (AOM) 806, used both for optical frequency shifting and on/off switching to create frequency shifted optical pulses. In second optical fiber 804, a modulator (MOD) pulser and a delay 808 may be added. MOD pulse 807 is an intensity modulated or frequency modulated or combined intensity and frequency modulated pulse. In examples, MOD pulse 807 may utilize an input of the CW light form laser 600 and create optical frequency shifting and on/off switching to create frequency shifted optical pulses, which is referred to as a light pulse 308 for this disclosure. MOD pulser 807 may be at least partially controlled by RF/IF pulse module 1000. The output from MOD pulse 807 may be a light pulse 308. As illustrated, an RF/IF pulse module 1000 may be connected to first AOM 806 and MOD pulse 807. RF/IF pulse module 1000 may comprise an electronic signal generator to emit two RF frequencies RF1 and RF2 and appropriate switching to drive AOMs 806 or MOD pulser 807 to create pulsed frequency shifted optical outputs. It also generates a CW difference (Intermediate) Frequency (IF) which is RF1-RF2 which is used as a reference to the receive optoelectronics quadrature downconverter 812. The first light pulse and the second light pulse may then be combined at second coupler 814. The combined light pulse from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through optical amplifier 604, the backscatter light may traverse to optical receiver 606. Optical receiver 606 may comprise a fiber coupled input to a reverse biased PIN photodiode to convert incident light to electrical current and integrated to an electronic conversion circuit to produce voltages and also amplify the voltages suitable to voltage levels compatible with digital acquisition. Bandwidths for these devices can be as high as 1 GHz.

The output from optical receivers 606 may be sent to quadrature downconverter 812 through an optical fiber. As illustrated, quadrature downhole converter 812 may be connected to RF/IF pulse module 1000. In examples, RF/IF pulse module 1000 may also generates a CW difference (Intermediate) Frequency (IF) which is RF1-RF2 which is used as a reference to the receive optoelectronics quadrature downconverter 812. Output from downhole converter 812 may be data as I and Q, which may be inputs to DAQ and processor 306. DAQ and processor 306 may function and operate as described above Information handling system 146 may process the receive the data from return optoelectronics 304 and perform one or more actions with the data to produce information that personnel may utilize to alter and/or change ongoing measurement operations.

FIG. 11 illustrates another example of DAS 300. In this example DAS 300 may be phase sensitive by utilizing a launch delay to form a pulsed coherent reference. As illustrated, a laser 600 or a plurality of lasers 600 may originate one or more single linewidth, high stability, CW light with high coherence, where the CW light exits from laser 600 and may traverse through DAS 300. The CW light from laser 600 may traverse to coupler 800. Coupler 800 may split the light pulse into a first light pulse that traverses through a first optical fiber 802 and a second light pulse that traverse through a second optical fiber 804. Further, first optical fiber 802 may comprise a MOD pulse 1100. MOD pulse 1100 is an intensity modulated or frequency modulated or combined intensity and frequency modulated pulse. In examples, MOD pulse 1100 may be used both for optical frequency shifting and on/off switching to create frequency shifted optical pulses. The output from MOD pulse 1100 may be a light pulse 308. In examples, MOD pulse 807 may utilize an input of the CW light form laser 600 and create optical frequency shifting and on/off switching to create frequency shifted optical pulses, which is referred to as a light pulse 308 for this disclosure. MOD pulser 807 may be at least partially controlled by pattern or modulation generator 1104. The output from MOD pulse 807 may be a light pulse 308 In second optical fiber 804, a second MOD pulse 1102, which may also output a light pulse 308, and a delay 808 may be added. As illustrated, pattern or modulation generation 1104 may be connected to first MOD pulse 1100 and second MOD pulse 1102. Pattern or modulation generation 1104 may comprise arbitrary signal generators that create amplitude modulation to define a pulse shape. In examples, pattern or modulation generation 1104 may operate and function to enable matched receiver filtering to enhance signal to noise interrogation performance. The combined light pulse from second coupler 814 may traverse to an optical amplifier 604 by another optical fiber.

The output from optical amplifier 604 may traverse to a circulator 310 through an optical fiber. As light pulses pass through circulator 310, they may enter sensor fiber 312. Sensor fiber 312 may be disposed at least partially within a wellbore 122. It should further be noted that circulator 310 may be disposed on surface or within wellbore 122, Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. The backscatter light may then traverse to a second optical amplifier 810, which may operate and function as optical amplifier 604. After passing through second optical amplifier 810, the backscatter light may traverse to quadrature downconverter 812 through an optical fiber. Output from downhole converter 812 may be data as I and Q, which may be inputs to optical receiver 606. As illustrated, optical receivers 606 may be connected to pattern or modulation generator 1104. In examples, pattern or modulation generator 1104 may create an amplitude modulated mask that enables matched filtering. The output from optical receivers 606 may be sent to pre-processing 1106. The output from pre-processing 1106 may be input to DAQ and processor 306. In examples, pre-processing may comprise fixed operational functions such as filtering, numeric conversions, stacking, normalizing, and/or the like. DAQ and processor 306 may function and operate as described above Information handling system 146 may process the receive the data from return optoelectronics 304 and perform one or more actions with the data to produce information that personnel may utilize to alter and/or change ongoing measurement operations.

Figure 12:
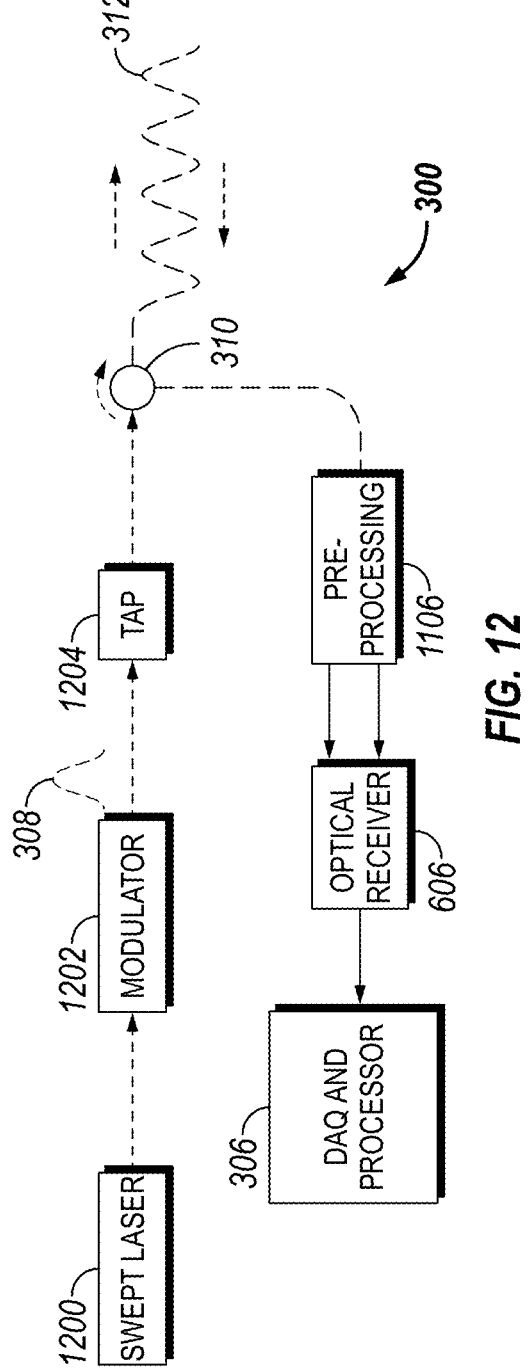

FIG. 12 illustrates another example of DAS 300. In this example DAS 300 may be phase sensitive by utilizing a CW swept laser to form a pulsed coherent reference. As illustrated, a swept laser 1200 may originate one or more originate one or more single linewidth, high stability, CW light with high coherence, where the CW light exits from laser 600 and may traverse through DAS 300. In examples, swept laser 1200 may be a laser with direct or external cavity modulation via mechanical means or a laser with optical index of modulation. The output from swept laser 1200 may be a single laser or plurality of laser that produces multiple frequencies for different light pulses. These CW light may pass to modulator 1202 through an optical fiber.

Modulator 1202 may be an in-line device which may create both optical phase and optical intensity modulation which is provided an electrical input for the modulation. In examples, modulator 1202 may operate and function in conjunction with swept laser 1200 to create a precise repeatable optical wavelength sweep over a programmable wavelength range, which may be referred to as light pulse 308. The output from modulator 1202, light pulse 308, may traverse to tap 1204. Tap 1204 may comprise a passive fiber optic optical tap coupler which typically allots a small percentage (<5%) of the light for detection and processing). In examples, tap 1204 may operate and function to permit examination optical intensity of the laser sweep within pre-processing unit 1106 to create correction signals to 1202 modulator drive. The output from tap 1204 may connect to a circulator 310 through an optical fiber.

As light pulses 308 pass through circulator 310 they may enter sensor fiber 312, Sensor fiber 312 may be disposed at least partially within a wellbore 122. I should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Circulator 310 may guide the backscatter light to pre-processing 1106. As illustrated, swept laser 1200 and tap 1204 may be connected to pre-processing 1106. This may allow for examination optical intensity of the laser sweep within pre-processing unit 1106 to create correction signals to 1202 modulator drive. The output from pre-processing 1106 may be transmitted to an optical receiver 606 by an optical fiber.

The output from optical receiver 606 may be sent to DAQ and processor 306. DAQ and processor 306 may function and operate as described above Information handling system 146 may process the receive the data from return optoelectronics 304 and perform one or more actions with the data to produce information that personnel may utilize to alter and/or change ongoing measurement operations.

Figure 13:
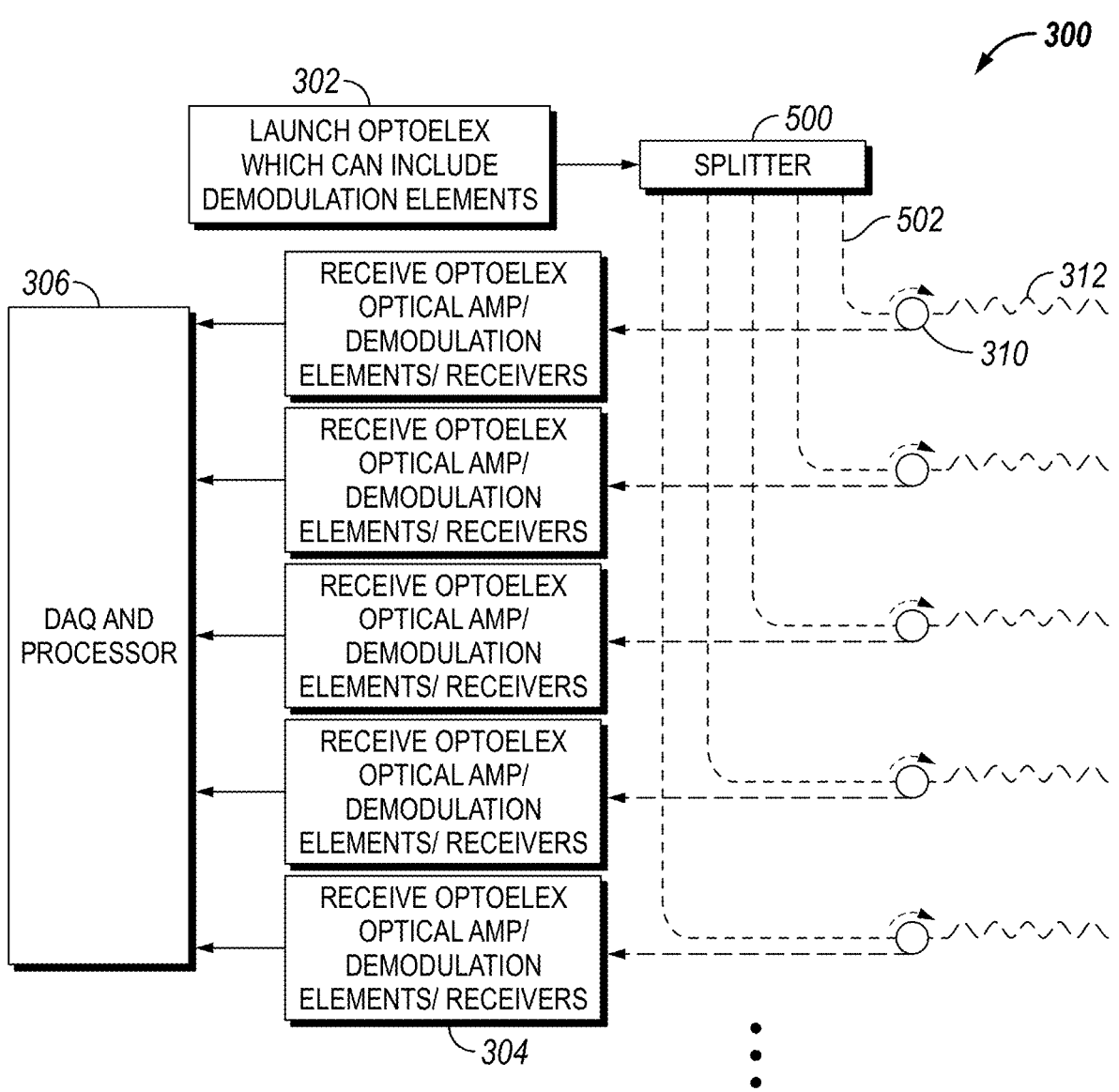

FIG. 13 illustrates another example of DAS 300 in which a launch optoelectronics 302 originates one or more light pulses 308 to a splitter 500. In examples, optoelectronics 302 may include a demodulation element. A demodulation element may comprise optical elements such as hybrid quadrature devices or after optical reception, electronic circuitry which enable quadrature signal creation. Further, demodulation element may operate and function to create baseband electrical quadrature signals which may be digitized and demodulated within DAQ and processor 306. The light pulse output may traverse to splitter 500 through an optical fiber. Splitter 500 may receive input light (fiber pigtail) from launch optoelectronics 302 and implements fiber guided light splitters or predetermined taps to produce an N-fold number of optical outputs via fiber pigtails which are typically all the optical outputs provide approximately the same output intensity. As illustrated, there may be any number of optical outputs from splitter 500.

Each of the optical outputs may be connected by an optical fiber 502 to a circulator 310. Thus, each optical output from splitter 500 has its own circulator 310. This may allow for a single launch optoelectronics 302 to service a plurality of sensor fibers 312. As light pulses 308 pass through circulator 310 they may enter sensor fiber 312, Sensor fiber 312 may be disposed at least partially within a wellbore 122. It should further be noted that circulator 310 may be disposed on surface or within wellbore 122. Sensor fiber 312 may be permanently deployed in a wellbore 122 via single- or dual-trip completion strings, behind casing, on tubing, or in pumped down installations. In examples, sensor fiber 312 may be temporarily deployed via coiled tubing, wireline, slickline, or disposable cables.

As discussed above, backscatter light from sensor fiber 312 may reflect from all locations along the sensor fiber 312 to circulator 310. Ad there are multiple circulators 310, each circulator 310 may then direct the backscatter light to an individual return optoelectronics 304. In examples, not illustrated, each circulator 310 may be connected to a single return optoelectronics 304. Return optoelectronics 304 may operate and function as described above. Additionally, in this example, return optoelectronics 304 may comprise all components discussed above regarding return optoelectronics 304, as well as an optical amplifier (AMP), demodulation elements, and/or an optical receiver 606. The output from return optoelectronic 304 may be sent to DAQ and processor 306. DAQ an processor 306 may function and operate as described above Information handling system 146 may process the receive the data from return optoelectronics 304 and perform one or more actions with the data to produce information that personnel may utilize to alter and/or change ongoing measurement operations.

DAS system 300 is also applicable in other applications not specific to oil and gas measurements or the oil and gas industry. DAS system 300 is also applicable in applications of human endeavors in which technology is utilized to better human life. For example, there are many systems in place, in cities, that use technology to improve human life. In these "future cities" DAS system 300 may be utilized in a common local to control a large number of systems and sensors.

One such system that may utilize DAS system 300 is security infrastructures that are physical or electronic. For example, sensor fiber 312 may be integrated into a fiber optic telecommunication network. This integration may be created by dark fibers reserved for future sensing applications. In this disclosure, dark fibers are fibers within an optical fiber cable that have not been or are not currently being used. Within the fiber optic telecommunication network may be controls for power, water sewage, gas line, and/or the like. DAS system 300 may be able to sense third party intrusion within the telecommunication network by acoustic emissions or vibrations from digging or trenching, or drilling equipment. Other types of physical infrastructures that may utilize DAS system 300 are perimeter and border security systems, bridges, dams, and/or other large structures. In these applications, sensor fiber 312 may be integrated into these physical infrastructures by direct fiber mounting or embedding into structures, or fences, or burial along the perimeter. Another physical infrastructure may be road in which DAS system 300 may be used to create "smart roads." These smart roads may utilize sensor fiber 312 for traffic monitoring, congestion detection and speed control, and road conditions. In these applications, sensor fibers 312 may be integrated into a smart road by embedded into the road itself during construction or post construction trenched during striping processes or incorporated into medians or road skirts. This may allow for sensor fibers 312 to measure and control measured vibration signals are processed and characterized for event types of interest as well as determination and status/alarm levels in real time Vehicle speed, weight, tire count, detection and location of emergency vehicles through active acoustics.

Outside of smart roads, railways may utilize DAS system 300 to determine traffic conditions, rock falls, wheel cracks, and/or train tracking. In these examples, sensor fibers 312 may be integrated into railways by being buried under or aside the track bed thus sensitive to dynamic vibrations. This may allow for sensor fibers 312 to measure and control measured vibration signals are processed and characterized for event types described as well as determination and status/alarm levels in real time.

Physical structures such as power systems may utilize DAS system 300 for cable monitoring, transmission line vibration, and/or substation monitoring. In these examples, sensor fibers 312 may be integrated into these power systems by power lines manufactured with fiber placed within the hollow core of the power cable. As these fibers are integral to the power cable, they are sensitive to both strain and vibrations. Substation monitoring involves embedment of the fibers or ground burial of the fibers in close proximity to the pads and the substation equipment. Sensor fibers 312 may measure and control measured vibration signals are processed and characterized for event types described as well as determination and status/alarm levels in real time.

Geophysical implementation of DAS system 300 may be used to track land subsidence (risk locations) as well as monitoring for earthquakes and land seismicity. In these applications DAS system 300 may be integrated through sensor fiber 312 by burial of the fiber. Sensor fibers 312 may then measure and control Measured vibration signals are processed and characterized for event types described as well as determination and status/alarm levels in real time.

The architecture described above for DAS system 300 implements a single launch system to feed two or more sensors (i.e., sensor fibers). Current technology does not teach a single launch system that can handled two or more sensors. Additionally, the architecture reduces the cost for DAS systems 300 as it reduced hardware for DAS utilization.

The system and methods described above enable large scale monitoring in a cost-effective way while enabling better use of the existing fibers in umbilical and flow lines by innovative use of circulators. The system calibration and process flow for each fiber span and potential application enable real-time automated sensing and diagnostics by exception-based monitoring to further determine and classify events over the life of the asset. The system can be used to control sensing applications to align with seismic surveys where both flow lives and downhole sensing fibers can be used to collect seismic data and illuminate the reservoir.

The systems and methods for a DAS system discussed above, may be implemented to allow for the utilization of two or more sensors from a single source and may comprise any of the various features of the systems and methods disclosed herein, including one or more of the following statements.

Statement 1: A distributed acoustic system (DAS) may comprise at least one laser that that transmits at least one continuous wave (CW) light, a pulser disposed after and optically connected to the at least one laser to receive the CW light from the at least one laser and form a light pulse, and a splitter optically connected to the pulser to optically split the light pulse into a plurality of light pulses, wherein each of the plurality of light pulses is an output of the splitter. The DAS may further comprise a proximal circulator optically connected to a first output of the splitter, a distal circulator optically connected to the proximal circulator, and a sensor fiber attached to the distal circulator.

Statement 2: The DAS of statement 1, further comprising a gain fiber which optically connects the distal circulator to the proximal circulator.

Statement 3: The DAS of statements 1 or 2, further comprising a first optical receiver optically connected to the proximal circulator.

Statement 4: The DAS of any previous statements 1-3, further comprising a first optical receiver optically connected to the distal circulator.

Statement 5: The DAS of any previous statements 1-4, further comprising a second proximal circulator optically connected to a second output of the splitter.

Statement 6: The DAS of statement 5, further comprising a second distal circulator optically connected to the proximal circulator by a gain fiber.

Statement 7: The DAS of statement 6, further comprising a second sensor fiber attached to the second distal circulator.

Statement 8: The DAS of statement 5, further comprising a first optical receiver optically connected to the proximal circulator.

Statement 9: The DAS of statement 8, further comprising a second optical receiver optically connected to the distal circulator.

Statement 10: The DAS of any previous statements 1-5, further comprising a wavelength division multiplexer (WDM) optically connected to the at least one laser as an input and to the splitter as an output.

Statement 11: A method may comprise setting a launch power for a continuous wave (CW) light that emits from a laser, receiving the CW light from the laser with a pulser, which form one or more light pulses from the CW light, and transmitting the one or more light pulses from the laser at a set pulse power into a distributed acoustic system (DAS), wherein the DAS comprises a fiber optical cable disposed in a flowline and a sensor fiber. The method may further comprise measuring a signal to noise ratio (SNR) from a backscatter light created within the fiber optical cable and the sensor fiber, generating a SNR table that compares the backscatter light from the fiber optical cable to the pulse power and compares the backscatter light form the sensor fiber to the pulse power, and selecting the pulse power for one or more measurements within the fiber optical cable to the sensor fiber based at least in part on the SNR table.

Statement 12: The method of statement 11, wherein the fiber optical cable is a gain fiber.

Statement 13: The method of statements 11 or 12, further comprising adjusting one or more properties of the DAS to increase a spatial resolution or pulse repetition rate.

Statement 14: The method of statements 13, wherein the one or more properties of the DAS are a laser pulse power, a laser pulse width, or a system gauge length.

Statement 15: The method of any previous statements 11-13, further comprising a second fiber optical cable disposed within the flowline and a second sensor fiber.

Statement 16: The method of statement 15, wherein the second fiber optical cable is a gain fiber.

Statement 17: The method of statement 16, further comprising adjusting one or more properties of the DAS to increase a spatial resolution or pulse repetition rate within the second fiber optical cable.

Statement 18: The method of statement 17, wherein the one or more properties of the DAS are a laser pulse power, a laser pulse width, or a system gauge length.

Statement 19: The method of any previous statements 11-13 or 15, further comprising a wavelength division multiplexer (WDM) optically connected to the laser as an input to the WDM and optically connected to the splitter as an output to the WDM.

Statement 20: The method of statement 19, further comprising a Raman laser optically connected to the WDM.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A distributed acoustic system (DAS) comprising:
at least one laser that that transmits at least one continuous wave (CW) light;
a pulser disposed after and optically connected to the at least one laser to receive the CW light from the at least one laser and form a light pulse;
a splitter optically connected to the pulser to optically split the light pulse into a plurality of light pulses, wherein each of the plurality of light pulses is an output of the splitter;
a plurality of circulators optically connected to the splitter;
a sensor fiber attached to each the distal circulator of the plurality of circulators; and
a plurality of optical receivers, wherein each receiver of the plurality of receivers is optically connected to a respective circulator of the plurality of circulators.

2. The DAS of claim 1, further comprising a gain fiber which optically connects the distal circulator to the proximal circulator.

3. The DAS of claim 1, further comprising a first optical receiver optically connected to the proximal circulator.

4. The DAS of claim 1, further comprising a first optical receiver optically connected to the distal circulator.

5. The DAS of claim 1, further comprising a second proximal circulator optically connected to a second output of the splitter.

6. The DAS of claim 5, further comprising a second distal circulator optically connected to the proximal circulator by a gain fiber.

7. The DAS of claim 6, further comprising a second sensor fiber attached to the second distal circulator.

8. The DAS of claim 5, further comprising a first optical receiver optically connected to the proximal circulator.

9. The DAS of claim 8, further comprising a second optical receiver optically connected to the distal circulator.

10. The DAS of claim 1, further comprising a wavelength division multiplexer (WDM) optically connected to the at least one laser as an input and to the splitter as an output.

11. A method comprising:
setting a launch power for a continuous wave (CW) light that emits from a laser;
receiving the CW light from the laser with a pulser, which form one or more light pulses from the CW light;
transmitting the one or more light pulses from the laser at a set pulse power into a distributed acoustic system (DAS), wherein the DAS comprises a fiber optical cable disposed in a flowline and a sensor fiber;
passing a backscatter light created within the fiber optical cable and the sensor fiber through a circulator, wherein the circulator is optically connected to a corresponding optical receiver of a plurality of optical receivers, and wherein the circulator directs the backscatter light to the corresponding optical receiver;
measuring a signal to noise ratio (SNR) from the backscatter light created within the fiber optical cable and the sensor fiber;
generating a SNR table that compares the backscatter light from the fiber optical cable to the pulse power and compares the backscatter light form the sensor fiber to the pulse power; and
selecting the pulse power for one or more measurements within the fiber optical cable to the sensor fiber based at least in part on the SNR table.

12. The method of claim 11, wherein the fiber optical cable is a gain fiber.

13. The method of claim 11, further comprising adjusting one or more properties of the DAS to increase a spatial resolution or pulse repetition rate.

14. The method of claim 13, wherein the one or more properties of the DAS are a laser pulse power, a laser pulse width, or a system gauge length.

15. The method of claim 11, further comprising a second fiber optical cable disposed within the flowline and a second sensor fiber.

16. The method of claim 15, wherein the second fiber optical cable is a gain fiber.

17. The method of claim 16, further comprising adjusting one or more properties of the DAS to increase a spatial resolution or pulse repetition rate within the second fiber optical cable.

18. The method of claim 17, wherein the one or more properties of the DAS are a laser pulse power, a laser pulse width, or a system gauge length.

19. The method of claim 11, further comprising a wavelength division multiplexer (WDM) optically connected to the laser as an input to the WDM and optically connected to the splitter as an output to the WDM.

20. The method of claim 19, further comprising a Raman laser optically connected to the WDM.

\* \* \* \* \*